United States Patent
Balakrishnan et al.

(10) Patent No.: US 12,346,347 B2
(45) Date of Patent: Jul. 1, 2025

(54) GENERATING RESPONSES TO REAL-TIME USER EVENTS UTILIZING USER PROFILE ATTRIBUTES AND A USER'S JOURNEY STATE OF AN EXPERIENCE JOURNEY

(71) Applicant: Qualtrics, LLC, Provo, UT (US)

(72) Inventors: Shankar Balakrishnan, Kirkland, WA (US); Michel Feaster, Seattle, WA (US); Evan Reynolds, Seattle, WA (US)

(73) Assignee: Qualtrics, LLC, Provo, UT (US)

( * ) Notice: Subject to any disclaimer, the term of this patent is extended or adjusted under 35 U.S.C. 154(b) by 0 days.

(21) Appl. No.: 17/818,632

(22) Filed: Aug. 9, 2022

(65) Prior Publication Data

US 2024/0004903 A1   Jan. 4, 2024

Related U.S. Application Data

(60) Provisional application No. 63/367,437, filed on Jun. 30, 2022.

(51) Int. Cl.
*G06F 16/28* (2019.01)
*G06F 9/54* (2006.01)
*G06N 20/00* (2019.01)

(52) U.S. Cl.
CPC ............ *G06F 16/285* (2019.01); *G06F 9/542* (2013.01); *G06N 20/00* (2019.01)

(58) Field of Classification Search
CPC ........ G06F 16/285; G06F 9/542; G06N 20/00
See application file for complete search history.

(56) References Cited

U.S. PATENT DOCUMENTS

| | | | |
|---|---|---|---|
| 2016/0212266 A1* | 7/2016 | Soundar | H04M 3/5183 |
| 2018/0337875 A1* | 11/2018 | Friio | H04L 67/133 |
| 2019/0166224 A1* | 5/2019 | Xiao | H04L 67/306 |
| 2019/0333400 A1* | 10/2019 | Saini | G09B 7/00 |
| 2020/0118145 A1* | 4/2020 | Jain | G06Q 30/02 |

(Continued)

OTHER PUBLICATIONS

"What is Amazon DynamoDB?," webpage <https://docs.aws.amazon.com/amazondynamodb/latest/developerguide/Introduction.html>, 2 pages, retrieved Jul. 17, 2023.

(Continued)

*Primary Examiner* — Courtney Harmon
(74) *Attorney, Agent, or Firm* — Keller Preece PLLC

(57) ABSTRACT

The present disclosure relates to systems, non-transitory computer-readable media, and methods for determining (and performing) system actions for particular users in response to real-time events based on the real-time event, an attribute of a user profile, and a journey state of the particular user on an experience journey. More specifically, in one or more embodiments, the disclosed systems respond in real-time utilizing both real-time data and batch data from a variety of disparate computing systems. To illustrate, in some embodiments, the disclosed systems detect a real-time event and identify an attribute of a user profile corresponding to the real-time event. In proximity to detecting the real-time event, the disclosed systems identify a journey state for the user profile along an experience journey. Based on the real-time event, the attribute of the user profile, and the journey state, the disclosed systems can dynamically determine system action.

20 Claims, 11 Drawing Sheets

(56) References Cited

U.S. PATENT DOCUMENTS

| | | | | |
|---|---|---|---|---|
| 2020/0372016 | A1* | 11/2020 | Rogynskyy | H04L 67/1095 |
| 2021/0195442 | A1* | 6/2021 | Agarwal | H04L 43/0876 |
| 2021/0295177 | A1* | 9/2021 | Joshi | H04L 67/306 |
| 2022/0147406 | A1* | 5/2022 | Laurenzio | H04L 67/306 |
| 2023/0004727 | A1* | 1/2023 | Oberoi | H04L 51/02 |
| 2023/0177539 | A1* | 6/2023 | Kotta | G06Q 30/0271 |
| | | | | 705/7.32 |
| 2023/0419165 | A1* | 12/2023 | Chauhan | G06N 20/00 |

OTHER PUBLICATIONS

"Apache nifi," webpage <https://nifi.apache.org/>, 2 pages, retrieved Jul. 17, 2023.

* cited by examiner

GENERATING RESPONSES TO REAL-TIME USER EVENTS UTILIZING USER PROFILE ATTRIBUTES AND A USER'S JOURNEY STATE OF AN EXPERIENCE JOURNEY

CROSS-REFERENCE TO RELATED APPLICATIONS

This application claims the benefit of, and priority to, U.S. Provisional Application No. 63/367,437, entitled "GENERATING RESPONSES TO REAL-TIME USER EVENTS UTILIZING USER PROFILE ATTRIBUTES AND A USER'S JOURNEY STATE OF AN EXPERIENCE JOURNEY," filed Jun. 30, 2022, the contents of which are hereby incorporated by reference in their entirety.

BACKGROUND

In recent years, conventional systems have improved the variety and artificial intelligence of algorithms that track and perform digital actions. These conventional systems may include experience management systems, digital survey distribution systems, software code modification systems, and/or other systems that implement digital processes. For example, several digital systems have independently developed and implemented computing models to track digital actions across web browsers, mobile applications, and other software applications according to user permissions or opt-ins. For instance, conventional systems may track desktops or mobile computing devices using a web browser to respond to digital surveys, transmit electronic communications, or synthesize user segments based on user inputs. Independent from such tracking, several conventional systems have developed and implemented computing models to perform various digital actions using servers.

Although conventional systems can perform system actions, many conventional systems perform canned and generic actions for users that cannot effectively track or engage with real-time events. Accordingly, such systems have a number of problems in relation to accuracy, efficiency, and flexibility of operation. For instance, while conventional systems have increasingly attempted to draw data from other independently operated computing systems, many such systems still work independently. For example, many conventional systems utilize various separate user profile databases and/or separated tracking of events across different systems, where some systems track time-delayed or historical data and other independent systems track extemporaneous events. Consequently, the independently developed tracking and digital action models of conventional systems have fomented a variety of disconnected platforms that computing systems often must operate independently without sharing data. Within such a tangle of disconnected platforms, conventional systems exhibit a number of technical shortcomings. To illustrate, conventional systems isolate applications into separate computing systems, inefficiently execute rigid algorithms that limit digital actions to prescheduled intervals or times, and utilize separate or navigation-intensive user interfaces.

As an example of disconnected platforms, conventional systems often implement plugins and other software components that operate exclusively with a single platform. In such cases, conventional systems may employ customized software components that solely recognize data conforming to a data model associated with a single platform, such as a single platform for biographical data or some other independent platform for tracking news events. Accordingly, many conventional systems fail to recognize data from different platforms organized in a different data model or software language. In addition to customized programming languages, conventional systems may implement software components that are incompatible across multiple platforms.

Due to the rigid structure just described, some conventional systems also waste computing resources and operate with slow and inefficient inter-system computing protocols. For example, conventional systems may implement data requests that lead to inefficient, delayed reactions to changes across multiple computing systems. To illustrate, in some cases, conventional systems periodically request individual updates from other computing systems by using scheduled data requests. Because scheduled data requests occur at predetermined times and often cannot adjust to extemporaneous events, conventional systems often identify changes in other computing systems (or transmit such changes) at a delayed time rather than when those changes occur in real time. Such data requests can accordingly create inefficient cross-system changes and actions.

In part due to the disconnected and inefficient structure of existing analytics systems, conventional systems have historically proliferated independent (and sometimes duplicative) graphical user interfaces that require excessive cross-interface navigation and inputs. Specifically, some conventional systems implement a different, independent graphical user interface for each integrated computing system, thereby leading to an inordinate number of inputs and interactions with disparate graphical user interfaces by a client device. For example, to build a digital workflow, conventional systems may require a client device to navigate, select, and/or apply feature(s) in a user interface for a first platform, switch to a different user interface for a second platform, and then navigate, select, and/or apply additional feature(s) in another separate, disconnected user interface.

These along with additional problems and issues exist with regard to conventional systems.

BRIEF SUMMARY

This disclosure describes embodiments of systems, non-transitory computer-readable media, and methods that provide benefits and/or solve one or more of the foregoing or other problems in the art. For example, the disclosed systems determine (and perform) system actions for particular users in response to real-time events based on the real-time event, an attribute of a user profile, and a journey state of the particular user on an experience journey. More specifically, in one or more embodiments, the disclosed systems respond in real-time utilizing both real-time data and batch data from a variety of disparate computing systems. To illustrate, in some embodiments, the disclosed systems detect a real-time event and identify an attribute of a user profile corresponding to the real-time event. In proximity to detecting the real-time event, the disclosed systems identify a journey state for the user profile along an experience journey. Based on the real-time event, the attribute of the user profile, and the journey state, the disclosed systems can dynamically determine system action.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
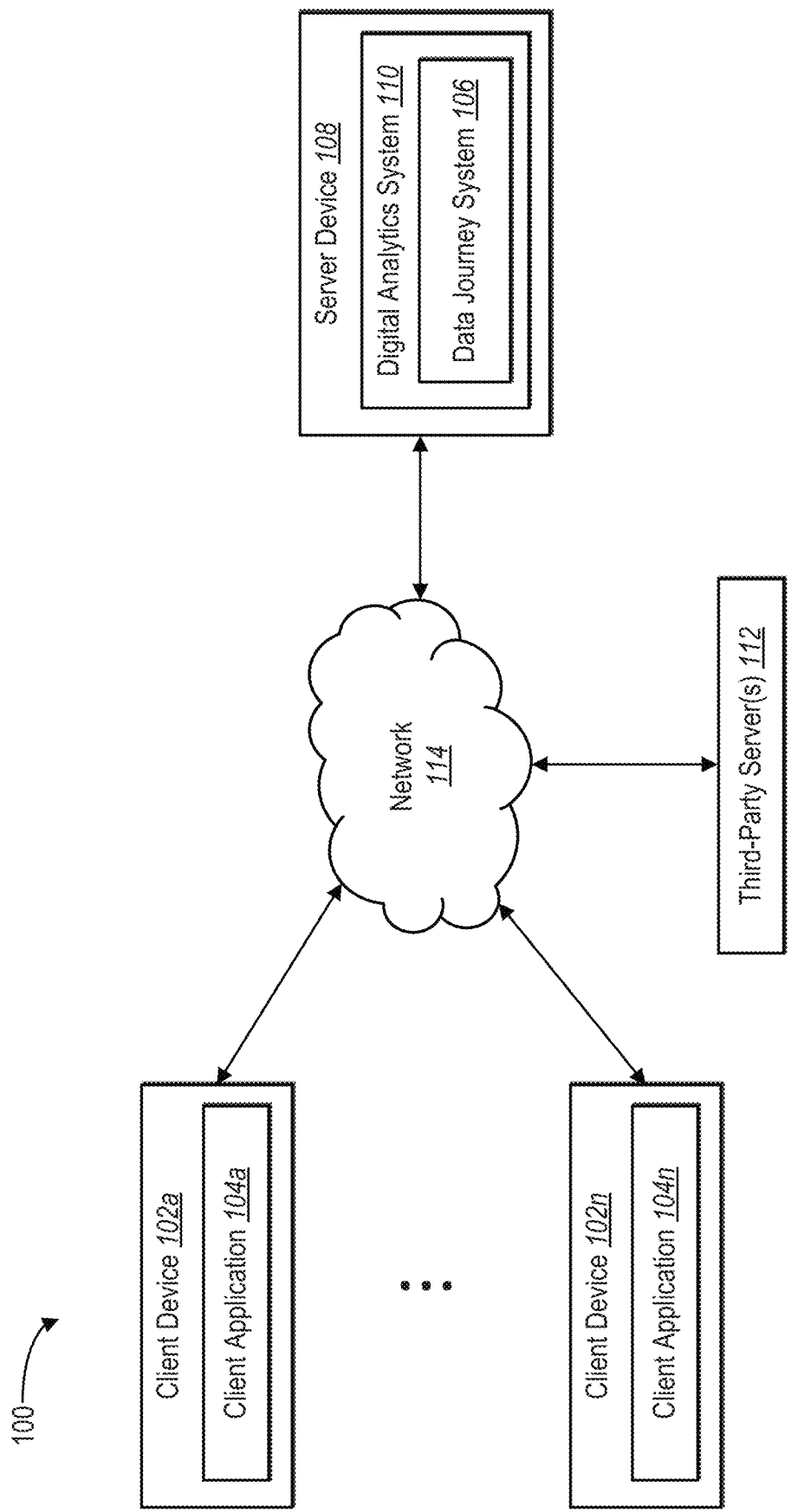
FIG. 1 illustrates a diagram of an environment in which a digital analytics system and a data journey system can operate in accordance with one or more embodiments.

This disclosure describes one or more embodiments of a data journey system that determines system actions in response to real-time events utilizing user profile attributes and journey states along experience journeys. More specifically, in one or more embodiments, the data journey system receives data for a real-time event and identifies an attribute of a user profile corresponding to the real-time event, including utilizing various third-party data sources. Additionally, in one or more embodiments, the data journey system determines a journey state for the user profile along an experience journey. Based on the real-time event, the attribute of the user profile, and the journey state, the data journey system can respond in real-time by determining system action.

As mentioned, in one or more embodiments, the data journey system receives a real-time event and determines a corresponding attribute of a user profile. More specifically, in some embodiments, the data journey system receives a data indication of a real-time event, including, but not limited to, such a data indication from a third-party system. To illustrate, the data journey system can receive a real-time event including user interaction or input, third-party system action, and/or an indication of a digital or physical occurrence. For example, the data journey system can receive an indication from a third-party system that a sports team has scored, an airplane has landed, a product has been restocked or otherwise become available, or some other event has taken place.

In response to receiving this real-time event, the data journey system can identify a user and/or a user profile corresponding to the real-time event. In one or more embodiments, the data journey system queries a unified database including data from various third-party systems for information corresponding to the user and/or user profile. Accordingly, in some embodiments, the data journey system searches the user profile for an attribute corresponding to the real-time event. For example, the data journey system can identify a user profile with an attribute of interest in a particular baseball team.

Further, in one or more embodiments, the data journey system determines a journey state of the user corresponding to the real-time event. To illustrate, the data journey system can track experience journeys of various users on various systems. In some embodiments, the data journey system tracks experience journeys as sequences of events corresponding to the user. For example, the data journey system can manage experience journeys for planning a vacation, using an amusement park, scheduling an event, opening an account, etc. The data journey system can identify a journey state based on various user profile attributes and/or historical user actions. Further, the data journey system can determine journey states utilizing a rules-based algorithm and/or a machine learning model.

As mentioned, in one or more embodiments, the data journey system determines a journey state based on a rules-based model. To illustrate, in one or more embodiments, the data journey system identifies a best match between real-time events corresponding to a user, user attributes, and a journey state on an experience journey. In some embodiments, the data journey system generates future action scores that reflect likelihoods of potential user actions based on user attributes, real-time events, and experience journeys. Accordingly, the data journey system can determine system actions based on the predicted user actions and system goals.

Additionally, in one or more embodiments, the data journey system utilizes a journey state machine-learning model to determine a journey state of a user on an experience journey. In one or more embodiments, the data journey system utilizes a convolution neural network, a decision tree, and/or a long short term memory (LSTM) as the journey state machine-learning model. In some embodiments, the data journey system trains the journey state machine-learning model to determine a journey state for a user profile based on real-time events and/or attributes of the user profile.

In one or more embodiments, the data journey system organizes user profiles into clusters of users with a particular journey state at various points in an experience journey. Accordingly, the data journey system can track activities of journey-state clusters as groups. Further, the data journey system can utilize the actions of users within journey-state clusters to train and/or update a journey state machine-learning model and/or a rules-based algorithm for categorizing user profiles.

The data journey system can utilize these determined journey states to select and implement system action. More specifically, in one or more embodiments, the data journey system utilizes real-time events, corresponding attributes of user profiles, and journey states to determine system action. In one or more embodiments, the data journey system selects and implements system actions, such as providing a message or e-mail notification, distributing a digital survey, prompting an update from a user, providing a reward, modifying user access, and other system activities or prompts. Further, in some embodiments, the data journey system schedules a time for the user action based on the real-time events, attributes of user profiles, and journey states.

Additionally, in one or more embodiments, the data journey system provides a graphical user interface for efficient generation and implementation of orchestration triggers for system action. To illustrate, in some embodiments, the data journey system provides, via a graphical user interface, selectable options for orchestration triggers and selectable options for corresponding system actions. In one or more embodiments, the selectable options for orchestration triggers include options for a selected data source, a selected real-time event, a selected attribute of a given user, or a selected journey state. Accordingly, in in some embodiments, based on user selections of the selectable options, the data journey system can generate orchestration triggers including various criteria and a corresponding system action based on user input via a single, unified graphical user interface.

The data journey system provides many advantages and benefits over conventional systems and methods. For example, by utilizing and updating journey state in real-time, the data journey system improves real-time relevancy and accuracy of system actions for a user along an experience journey relative to conventional systems. Unlike conventional systems, the data journey system can extemporaneously send journey-state-specific notifications or perform other journey-state-specific actions based on real-time events. To illustrate, the data journey system improves the speed and reaction time of events in separate platforms or disconnected components of a single platform. For example, unlike conventional systems that track separate actions on separate systems, including utilizing disparate data organizations, the data journey system more efficiently uses computing resources by avoiding the slowdown of periodic and rigid updates typical of conventional systems. In some embodiments, the data journey system integrates data from disparate platforms into a unified database and connects data corresponding to real-time events with user-profile attributes of a user at a particular state along an experience journey.

In addition to improved accuracy and efficiency, the data journey system provides a graphical user interface that performs functions that conventional systems cannot perform and avoids cross-application navigation by introducing tools to generate a trigger-action sequence in a centralized graphical user interface. For example, the data journey system provides, for display within a unified graphical user interface, selectable options for orchestration triggers. Further, the data journey system can utilize real-time events and system actions that correspond to multiple different platforms. To illustrate, the data journey system can generate orchestration triggers previously absent from conventional systems—namely an orchestration trigger that connects various systems with the data journey system or that connects disconnected components of a single platform. Rather than force users to open, scroll, input, and switch between separate graphical user interfaces, the data journey system can provide a graphical user interface with options for orchestration triggers and systems actions to efficiently generate a trigger-action sequence that performs an identified system action upon detection of an orchestration trigger. Beyond an improved graphical user interface, in some embodiments, the data journey system also improves accuracy and flexibility of determining system action by updating criteria for categorizing users and criteria for determining system action, including by utilizing machine learning models. To illustrate, the data journey system can train and update a journey state machine-learning model to determine an updated journey state of a user with respect to an experience journey based on features corresponding to the experience journey (e.g., user actions in response to system actions). In addition to such machine-learned journey states, in one or more embodiments, the data journey system updates rules or weights of a model for determining future action scores based on the accuracy of predicted user actions. Accordingly, the data journey system can quickly and accurately respond to changing conditions of various types using either or both of a journey state machine-learning model or a future-action-score model.

The data journey system also improves efficiency over conventional systems by integrating parallel events across various third-party systems into a unified database. More specifically, by integrating third-party data into a unified database, the data journey system enables real-time responses to real-time events across a variety of systems. Further, the data journey system reduces or eliminates wasted computing resources required by conventional systems to independently process redundant inputs across various separate systems.

As illustrated by the foregoing discussion, the present disclosure utilizes a variety of terms to describe features and advantages of the data journey system. Additional detail is now provided regarding the meaning of such terms. For example, as used herein, the term "data indication" refers to a digital or an electronic communication. In particular, a data indication can include a data package including data corresponding to a digital or real-world event, action, or occurrence. To illustrate, in one or more embodiments, a data indication includes information about the event including timing, associated user profiles, type, etc. More specifically, a data indication can include data indicating attributes of an event detected on the third-party system.

Additionally, as used herein, the term "real-time event" refers to an event that is detected or observed and for which a data indication is sent or received within a threshold time from the detection or observation of the event or for which a response is performed within a threshold time from receipt of the data indication of the event. For example, a real-time event can include an event that is detected or observed and for which a system action is performed within a threshold time from receipt of the data indication of the event, such as within 30 seconds or 30 milliseconds. The threshold time for a response may be a suitable timeframe for real-time computing, such as in milliseconds or microseconds. The threshold time for a data indication of detection or observation of an event may be longer, such as seconds, hours, or a day. As suggested above, a real-time event can include physical or digital occurrences. In one or more embodiments, the data journey system tracks real-time events from various third-party systems. To illustrate, a real-time event can include a touchdown, entrance to an amusement park, a hurricane warning, a user selection, or a variety of other occurrences received by the data journey system.

Also, as used herein, the term "journey state" refers to a particular action, interaction, point, stage, level, or attribute along (or corresponding to) an experience journey. In one or more embodiments, a journey state refers to a current action, interaction, point, stage, level, or attribute that a user has most recently experienced along or during an experience journey. In one or more embodiments, the data journey system tracks user actions and system actions along an experience journey in real-time to track a user's journey state in real-time.

Further, as used herein, the term "experience journey" refers to an organized set of activities experienced by at least one user during interactions with an entity. To illustrate, an experience journey can include an ordered set of conditions, events, and/or actions encountered, performed, and/or experienced by a user during a user experience with the products or services of a company, an organization, or another entity. Such conditions, events, and/or actions may be recorded or tracked by computing devices of an entity or the user.

Additionally, as used herein, the term "system action" refers to a digital act, modification, process, task, or operation in relation to data corresponding to a particular system or platform. In particular, a system action can include a variety of actions, digital tasks, modifications, processes, or operations that modify, create, transmit, display, or store various data. In one or more embodiments, a system action includes implementing particular rules, data, and/or functions within a computing system. For example, a system action can include transmitting an electronic communication, generating a digital ticket, updating digital survey distribution data, adding data identifying or generating an orchestration trigger, adding or inserting code into a software application, or transmitting data to a third-party server, and a variety of other system actions. In certain implementations, a system action includes one or more bulk actions (e.g., large batches of actions performed over and over). For instance, a system action can include myriad different digital tasks across a variety of computing devices.

Also, as used herein, the term "journey-state cluster" refers to a set or group of users corresponding to a particular journey state. In particular, the term journey-state cluster can include a group of users currently at, currently experiencing, or most recently experienced a particular journey state. To illustrate, a journey-state cluster can include a group of users that have entered a theme park but not yet entered any queues, a group of users that have just opened a checking account, a group of users that have clicked on an advertisement but have not yet purchased anything, a group of users that bought a dog within twelve months, or a variety of groups of users at a variety of journey states along a variety of experience journeys.

Further, as used herein, the term "future action score" refers to a value reflecting the likelihood of a user action occurring in the future. In particular, a future action score can include a probability of a potential action based on user attributes, prior user actions, etc. To illustrate, a future action score can include a probability that a user will leave a platform, a score (e.g., from 1 to 10) reflecting a likelihood that a user will attend an event, or a variety of metrics reflecting a likelihood that a user will perform an action at a later time. Relatedly, as used herein, the term "predicted user action" refers to an action that a user is predicted or likely to undertake at a later time. In particular, a predicted user action can include a future user action for a particular user with the highest future action score.

Additionally, as used herein, the term "orchestration trigger" refers to one or more events, data sources, attributes, or journey states based upon which a system action is performed as part of a trigger-action sequence. In particular, an orchestration trigger includes a combination of two or more of a data source, real-time event, an attribute, or a journey state that (upon detection) triggers performance of a system action as part of a trigger-action sequence. Upon selection of an orchestration trigger for inclusion within a trigger-action sequence, the data journey system performs (or causes another system to perform) a system action in the form of a subsequent event or multiple subsequent events. Some examples of an orchestration trigger include a combination of a data source (e.g., news source, sporting event reporting, public transit system), a real-time event (e.g., sport score, product offering, sale of a property, stock price change or threshold), an attribute (e.g., fun, interested, age, gender), and journey state (e.g., membership level, stage of an airplane trip, location within an amusement park). Similarly, an orchestration trigger can include a certain timestamp or date being detected for components of the orchestration trigger.

Also, as used herein, the term "trigger-action sequence" refers to a defined sequence or digital workflow of one or more system actions that are performed based on one or more orchestration triggers. In particular embodiments, a trigger-action sequence includes (i) at least one orchestration trigger selected by a user via a graphical user interface to be a basis for (or trigger to) (ii) at least one system action selected by the user via a graphical user interface and automatically performed in response to detection of at least one orchestration trigger. Optionally, in certain implementations, a trigger-action sequence includes one or more conditions that are requisite to performing a system action.

Further, as used herein, a "machine learning model" refers to a computer representation that can be tuned (e.g., trained) based on inputs to approximate unknown functions. For instance, a machine-learning model can include, but is not limited to, a differentiable function approximator, a neural network (e.g., a convolutional neural network or deep learning model), a decision tree (e.g., a gradient boosted decision tree), a linear regression model, a logistic regression model, a clustering model, association rule learning, inductive logic programming, support vector learning, Bayesian network, regression-based model, principal component analysis, or a combination thereof.

Additional detail will now be provided in relation to illustrative figures portraying example embodiments and implementations of the data journey system. For example, FIG. 1 illustrates a block diagram of an example embodiment of a system 100. In general, and as illustrated in FIG. 1, the system 100 includes client devices 102a-102n including client applications 104a-104n. The client devices 102a-102n communicate with a server device 108, including a digital analytics system 110 and a data journey system 106, over a network 114. Further, the system 100 includes third-party server(s) 112 that may also communicate with the client devices 102a-102n and/or the server device 108 via the network 114.

As will be described in greater detail below, the client devices 102a-102n can perform or provide the various functions, features, processes, methods, and systems as described herein. Additionally, or alternatively, the server device 108 can perform or provide the various functions, features, processes, methods, and systems as described herein. In one or more embodiments, the client devices 102a-102n and the server device 108 coordinate together to perform or provide the various functions, features, processes, methods, and systems, as described in more detail below.

Generally, the client devices 102a-102n can include any one of various types of client devices. For example, the client devices 102a-102n can be a mobile device (e.g., a smart phone), tablet, laptop computer, desktop computer, or any other type of computing device as further explained below with reference to FIG. 7. Additionally, the client applications 104a-104n can include any one of various types of client applications. For example, one or more of the client applications 104a-104n can be a web browser, and users at the client devices 102a-102n may enter a Uniform Resource Locator (URL) or other address directing the web browser to access the data journey system 106 and/or digital analytics system 110 on the server device 108. Alternatively, the client application can be a native application installed and executed on the client devices 102a-102n.

Additionally, the server device 108 can include one or more computing devices including those explained below with reference to FIG. 7. The client devices 102a-102n, the server device 108, and the network 114 may communicate using any communication platforms and technologies suitable for transporting data and/or communication signals, including any known communication technologies, devices, media, and protocols supportive of data communications, examples of which are described with reference to FIG. 8.

Although not a requirement, in one or more embodiments, the data journey system 106 can be part of the digital analytics system 110. Accordingly, as shown in FIG. 1, the server device 108 hosts the digital analytics system 110, which includes the data journey system 106. In one or more embodiments, the digital analytics system 110 collects various types of data, including from the third-party server(s) 112 and provides data to the data journey system 106. Further, in some embodiments, the data journey system 106 receives and utilizes data, including real-time events, experience journey data, and/or data for user profiles. In other embodiments, the server device 108 can include a system other than the digital analytics system 110 for collecting, generating, accessing, or otherwise managing data. Additionally, the server device 108 can receive datasets via the network 114 from the client devices 102a-102n, the third-party server(s) 112, or from another source.

The third-party server(s) 112 can correspond to a variety of systems that track a variety of data for user accounts corresponding to the data journey system 106. To illustrate, the third-party server(s) 112 can include servers for systems that track or manage sales data, calendar data, user or customer data, financial data, location data, and a variety of other system and data types. In one or more embodiments, the third-party server(s) 112 provide data to the server device 108 and the data journey system 106 via the network 114.

Figure 2:
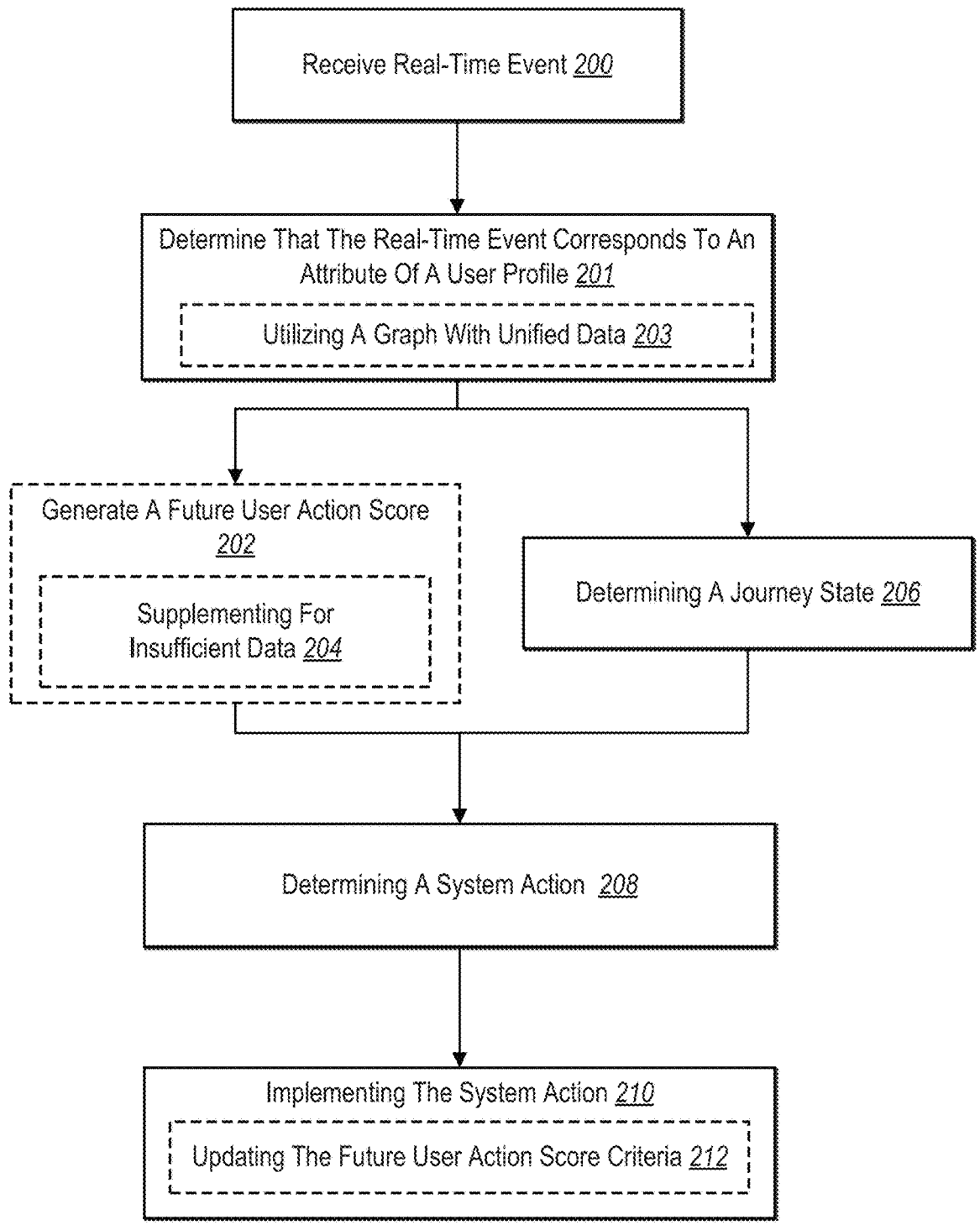
FIG. 2 illustrates an overview of the data journey system determining system actions utilizing a real-time event, a user attribute, and a journey state in accordance with one or more embodiments.

As discussed above, the data journey system 106 can determine and implement one or more system actions based on a real-time event, a user attribute, and a journey state corresponding to an experience journey. More specifically, FIG. 2 illustrates that the data journey system 106 can perform an act 200 of receiving a real-time event. In one or more embodiments, the data journey system 106 receives a data indication of the real-time event from a third-party system or another associated system. Additionally, in some embodiments, the data journey system 106 receives the data indication of the real-time event directly.

In one or more embodiments, the data journey system 106 receives a variety of data indications of various types of real-time events. To illustrate, in some embodiments, the data journey system 106 receives data indications of virtual occurrences, such as a user selection, a digital purchase, a vote in an online poll, a digital survey response, etc. Additionally, in one or more embodiments, the data journey system 106 receives a data indication of a physical occurrence from the real world, such as weather, traffic conditions, utilization of or entrance into various venues, adoption of a pet, arrival at or departure from a physical location, etc. For example, the data journey system 106 can receive a data indication of a patron entering a theme park based on a third-party system corresponding to the theme park detecting a scanning of a ticket for admission.

In response to receiving a real-time event, the data journey system 106 can perform an act 201 of determining that the real-time event corresponds to an attribute of a user profile. To illustrate, in one or more embodiments, the data journey system 106 receives a data indication of a real-time event that includes data or metadata corresponding to an associated user. In some cases, a data indication of a user selection can include a user identifier corresponding to the user. Accordingly, in some embodiments, the data journey system 106 identifies an attribute of the user profile that corresponds to the user selection. For example, based on receiving a data indication that a user selected a date for a theme park ticket, the data journey system 106 can retrieve user attributes from the user profile for a user related to the theme park, such as relevant media subscriptions, previous user actions at the theme park, a distance of residence from the theme park, a rank of frequency of travel to the theme park, frequently visited theme park rides or attractions, etc.

In addition, or in the alternative, in some embodiments, the data journey system 106 identifies attributes of user profiles by identifying users associated with an event. For example, in response to receiving a data indication of a score at a sporting event (e.g., a home run), the data journey system 106 can identify user profiles including a user attribute related to a sport's team with a player responsible for the scoring event (e.g., a baseball team with a play that hit the home run). Accordingly, in one or more embodiments, the data journey system 106 identifies an attribute of a user profile corresponding to the real-time event by searching for a particular attribute across a variety of user profiles.

In one or more embodiments, the data journey system 106 queries a unified database for attributes of user profiles. More specifically, as shown in FIG. 2, the data journey system 106 can perform an optional act 203 of utilizing a graph with unified data. In one or more embodiments, the data journey system 106 generates a unified database by continuously updating user profiles utilizing real-time and batch data from various third-party systems. To illustrate, the data journey system 106 can process incoming data points from various third-party data sources in parallel. In one or more embodiments, upon receiving real-time or batch data, the data journey system 106 identifies the source of the data (e.g., news service, bank system, amusement park). Further, in one or more embodiments, the data journey system 106 generates relationships between data points to form a graph of data, where various data points map onto one another. To illustrate, in some embodiments, the data journey system 106 generates joined relationships between various data sources.

In one or more embodiments, the data journey system 106 utilizes keys (e.g., join keys) to generate or map relationships between data points across different sources. Further, in some embodiments, the data journey system 106 generates a key for locating data points along the data graph. Accordingly, the data journey system 106 can quickly search for user profile attributes indicated by data points from a variety of third-party sources in a single, unified database. Further, the data journey system 106 can efficiently search the large quantity of data by utilizing the joined relationships between the data points.

Additionally, as shown in FIG. 2, the data journey system 106 can perform an optional act 202 of generating a future action score. As mentioned above, in one or more embodiments, the data journey system 106 scores potential future user actions based on previous user actions and/or user attributes. To illustrate, in some embodiments, the data journey system 106 generates rules for scoring potential future user actions utilizing historical data points. For example, the data journey system 106 can identify that a user in a particular demographic and having performed a particular action within a period of time is likely to perform a future user action. Thus, the data journey system 106 can score various potential future actions based on historical patterns.

For example, in one or more embodiments, the data journey system 106 determines a future action score indicating a likelihood that user will discontinue use of a product or service. To illustrate, in some embodiments, the data journey system 106 utilizes historical data (e.g., data representing user attributes) corresponding to users who previously discontinued use of a product or service. In some such embodiments, the data journey system 106 identifies historical data within a threshold time period of users discontinuing use of a product or service. Accordingly, the data journey system 106 can compare the historical data within the threshold time period of previous users discontinuing use of a product or service to a target user's data (e.g., data representing user attributes) within a threshold time period of the current time to determine a likelihood of that user discontinuing use of a product or service.

As also shown in FIG. 2, the optional act 202 can include an optional act 204 of supplementing for insufficient data. In one or more embodiments, the data journey system 106 scores potential future actions for a user profile with limited data. In response to identifying that the user profile has insufficient data in the user profile, the data journey system 106 can identify similar user profiles. Accordingly, in some embodiments, the data journey system 106 utilizes the similar user profiles to make one or more assumptions to supplement for insufficient data. Thus, the data journey system 106 can utilize this supplemented data to determine the future action scores for the user profile.

For example, in response to receiving a data indication of entry to a theme park, the data journey system 106 can determine future action scores for visiting various rides or attractions within the theme park. In one or more embodiments, the data journey system 106 utilizes historical data and user attributes to determine the future action scores. However, in this example, the user profile does not include historical ride and attraction attendance. Accordingly, the data journey system 106 can identify user profiles with similar attributes to those known about the user profile. In this example, the data journey system 106 identifies user profiles with similar demographic information and media subscriptions. Thus, in one or more embodiments, the data journey system 106 utilizes historical ride and attraction attendance of these similar user profiles to determine future action scores for ride and attraction attendance for the user profile.

In one or more embodiments, the data journey system 106 can utilize potential future action scores and predicted user actions to determine system action. To illustrate, in one or more embodiments, the data journey system 106 stores the potential future action scores and/or predicted future actions in corresponding user profiles in the unified database. Accordingly, in one or more embodiments, the data journey system 106 retrieves and utilizes the potential future action scores and/or predicted future actions as an attribute corresponding to a real-time event.

As also shown in FIG. 2, in one or more embodiments, the data journey system 106 performs an act 206 of determining a journey state. As noted above, and as will be discussed in greater detail below with regard to FIGS. 4A-4B, the data journey system 106 can determine a journey state for a user utilizing a journey state machine-learning model. More specifically, the data journey system 106 can train a machine-learning model to generate a journey state based on features, including various user attributes and user actions. Accordingly, the data journey system 106 can utilize the journey state machine-learning model to identify a journey state along an experience journey for a user profile.

In addition, or in the alternative, the data journey system 106 can determine a journey state based on criteria for various journey states with respect to an experience journey. To illustrate, the data journey system 106 can compare (i) user attributes and/or user actions corresponding to a user profile to (ii) criteria for a journey state to determine a particular journey state. If the data journey system 106 determines that the user profile attributes and actions match the attribute and action requirements for a journey state, the data journey system 106 can assign the user profile to the journey state. In one or more embodiments, the data journey system 106 can also utilize journey state thresholds to determine a sufficient match. In addition, or in the alternative, in some embodiments, the data journey system 106 determines a best match journey state with the most or highest percentage of requirements met.

In one or more embodiments, the data journey system 106 determines a journey state based on or in response to the real-time event. For example, in response to receiving a real-time event of theme park entry, the data journey system 106 can compare the corresponding user profile to various journey states along different theme park experience journeys. In this example, the data journey system 106 identifies that the scanned ticket for entry was a previously unscanned season pass. Accordingly, the data journey system 106 can assign a "beginning first season pass visit" journey state to the user profile from a "season pass" experience journey.

In one or more embodiments, the data journey system organizes user profiles into journey-state clusters based on determining journey states for user profiles. To illustrate, in some embodiments, the data journey system 106 assigns a user to a journey-state cluster based on the determined journey state, including via a machine-learning model. Thus, in one or more embodiments, the data journey system can utilize the journey-state clusters to track activities of journey-state clusters as groups and/or to implement system action to entire journey-state clusters of users.

As further shown in FIG. 2, the data journey system 106 can perform an act 208 of determining a system action. To illustrate, in one or more embodiments, in response to receiving the real-time event, the data journey system 106 can determine a system action utilizing the real-time event, the determined attribute of a user's user profile, and the journey state of the user with respect to an experience journey. In some embodiments, the data journey system 106 utilizes orchestration triggers to determine a system action. More specifically, the data journey system 106 can utilize orchestration triggers that utilize the real-time event, the determined attribute, and the journey state as a combination of triggers that (upon detection) prompt the data journey system 106 to perform a system action as part of a trigger-action sequence. Accordingly, the data journey system 106 can utilize data from various third-party systems to determine system actions in real-time.

For example, in response to receiving a data indication of a user entering a theme park, the data journey system 106 (i) identifies user profile attributes of a home address out-of-state and prior activity on thrill rides and (ii) determines a journey state of "beginning first season pass visit." The data journey system 106 can determine a system action by implementing an orchestration trigger for providing a welcome message out-of-state visitors on the journey state of "beginning first season pass visit." Further, the data journey system 106 can utilize the user profile attribute of frequenting thrill rides to implement the system action by generating the welcome message including current wait times for thrill rides at the theme park.

After determining the system action, as further shown in FIG. 2, the data journey system 106 can perform an act 210 of implementing the system action. To illustrate, in various embodiments, the data journey system 106 generates and provides messages and notifications, generates or modifies user profiles or accounts, generates and provides digital surveys, generates and provides digital objects, generates and modifies digital subscriptions, or performs a variety of other system actions. In one or more embodiments, the data journey system 106 performs the system action directly. In addition, or in the alternative, the data journey system 106 provides instructions to a third-party system to perform the system action.

As further shown in FIG. 2, the act 210 can include an optional act 212 of updating the future action score criteria. In one or more embodiments, the data journey system 106 tracks user responses to and/or interactions with implemented system actions. In one or more embodiments, the data journey system 106 can utilize user interactions with system actions to update future action score criteria and/or orchestration triggers. To illustrate, in one or more embodiments, the data journey system 106 determines a predicted action of a user in response to a predicted real-time event based on one or more future action scores for the user. Further, in some embodiments, the data journey system 106 receives a data indication of a real-time event corresponding to a user action. Thus, in one or more embodiments, the data journey system 106 can compare the predicted user action to the predicted real-time event to the user action in response to the real-time event. In some such cases, the data journey system 106 uses a loss function that compares classified labels for a user's predicted user action and the user's user action and determines a corresponding loss.

Based on this comparison (e.g., a loss from a loss function), the data journey system 106 can update scoring criteria to include the data point corresponding to the received actual real-time event. For example, the data journey system 106 can determine that users in a younger age demographic proceeded to a thrill ride with a low listed wait time after receiving a notification of thrill ride wait times, while users in a higher age demographic did not. Based on this determination, the data journey system 106 can add an age demographic user attribute requirement to the orchestration trigger for providing the wait times notification. In some cases, the data journey system 106 adjusts parameters of a future-user-action-scoring model (e.g., linear regression, decision tree, such as XG Boost) that generates future user action scores to improve further scoring by the future-user-action-scoring model.

Figure 3:
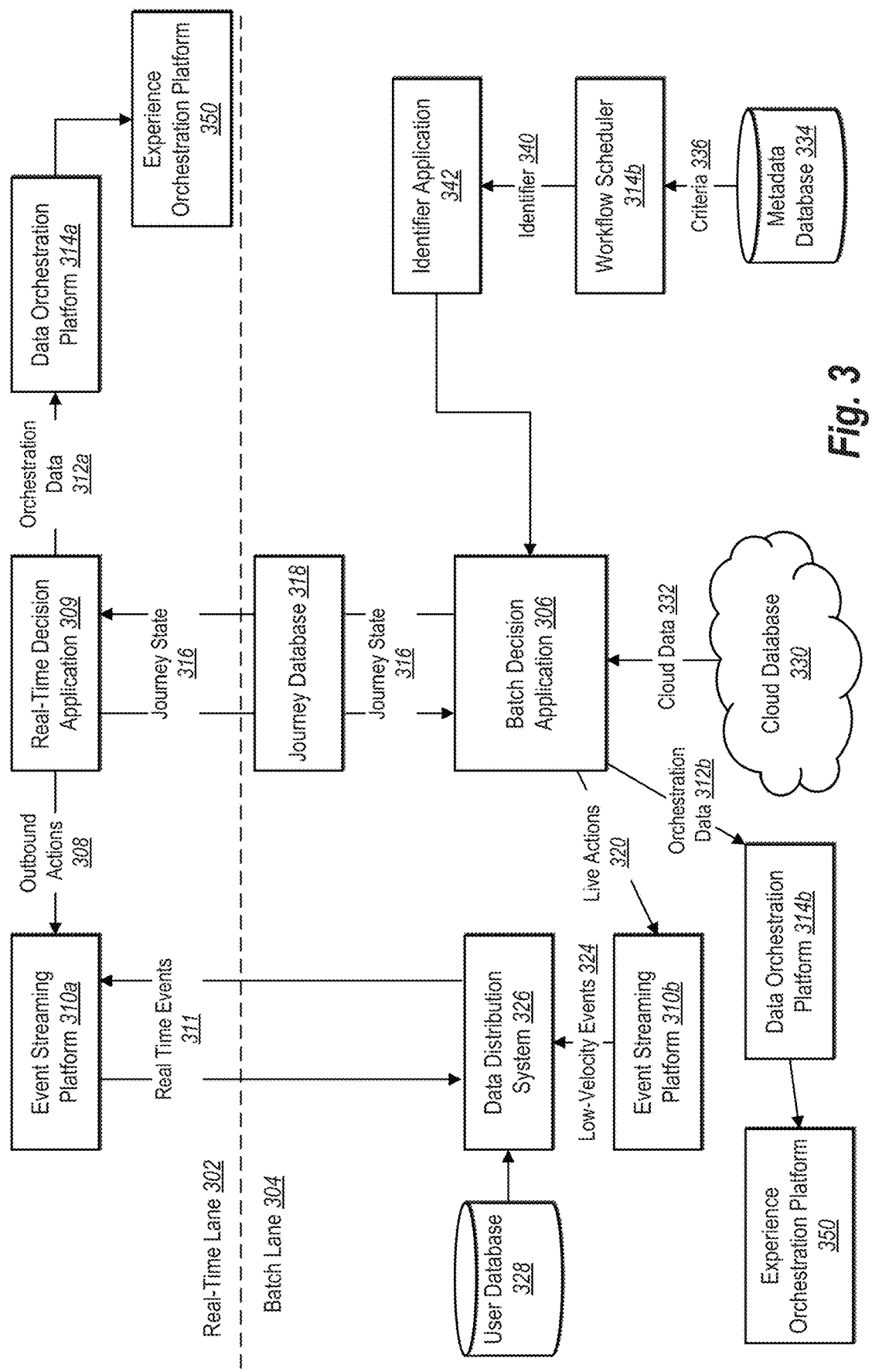
FIG. 3 illustrates a flowchart for data through a journey data system in accordance with one or more embodiments.

In one or more embodiments, the data journey system 106 communicates with various third-party systems and utilizes various platforms to process real-time data and/or batch data. FIG. 3 illustrates communication between various databases, platforms, and applications that the data journey system 106 utilizes to process real-time data and batch data in parallel to determine and execute system actions. More specifically, FIG. 3 illustrates a real-time lane 302 for processing real-time events and a batch lane 304 for processing historical data, scheduling future events, and processing of batch data. The various applications, platforms, and systems can be executed by one or more servers. For simplicity, this disclosure describes the various applications, platforms, and systems performing actions set forth below.

In one or more embodiments, the data journey system 106 utilizes a batch decision application 306 to determine system actions that will not be implemented instantaneously or in real-time. To illustrate, in one or more embodiments, the data journey system 106 utilizes the batch decision application to implement system actions that do not rely on real-time data. For example, the data journey system 106 can utilize the batch decision application 306 to schedule birthday emails to subscribers of a media platform at a particular journey state.

As also shown in FIG. 3, the data journey system 106 utilizes a real-time decision application 309 to determine system actions that utilize real-time data and/or that will be implemented in real-time or near-real time. In one or more embodiments, the data journey system 106 utilizes the real-time decision application 309 to implement system actions in response to receiving data indication or real-time events. For example, the data journey system 106 can utilize the real-time decision application 309 to implement an orchestration trigger in response to receiving a data indication of a priority pass being scanned at a queue in a theme park.

As shown in FIG. 3, the data journey system 106 can provide a journey states 316 to the batch decision application 306 via the journey database 318. The journey database 318 stores data regarding journey states of users along experience journeys. Additionally, as illustrated by FIG. 3, the data journey system 106 provides journey states 316 to the batch decision application 306 and the real-time decision application 309. Additionally, in one or more embodiments, a system action modifies journey states. Accordingly, as also illustrated by FIG. 3, the data journey system 106 received journey states 316 from the batch decision application 306 and the real-time decision application 309.

In one or more embodiments, the journey database 318 is a unified database where the data journey system 106 integrates various data from different third-party systems. As mentioned above, the data journey system 106 can continuously update journey states associated with user profiles and other user profile data. Further, the data journey system 106 can store the data by generating relationships between various data points to generate a graph of data. Accordingly, in some embodiments, the data journey system 106 generates one or more join keys and utilizes the join keys to quickly retrieve information from the journey database 318, including journey state information.

As further shown in FIG. 3, the real-time decision application 309 provides outbound actions 308 to an event streaming platform 310a. To illustrate, in one or more embodiments, the real-time decision application 309 determines system actions in real-time, including in response to data indication of real-time events. The real-time decision application 309 can provide outbound actions, including real-time system actions, to the event streaming platform. Accordingly, the event streaming platform can implement the real-time events.

Similarly, as shown in FIG. 3, the batch decision application can provide live actions 320 to the event streaming platform 310b. In one or more embodiments, the event streaming platform 310b is an additional instance of the event streaming platform 310a for handling live actions 320 from the batch decision application 306. Thus, the event streaming platform 310b can provide outbound actions that do not involve real-time data. Accordingly, as shown in FIG. 3, the event streaming platform 310b can provide low-velocity events 324 to the data distribution system 326 to perform.

In one or more embodiments, the event streaming platform 310a provides real-time events 311 to and/or receives real-time events 311 from a data distribution system 326. To illustrate, the data journey system 106 can utilize the data distribution system 326 to distribute various types of data, including providing notifications, surveys, messages, and other data to user devices. As shown in FIG. 3, the data distribution system 326 can receive data from a user database 328. In one or more embodiments, the data distribution system 326 utilizes user data from the user database 328 to distribute data to user profiles and user devices. Further, the data distribution system 326 can provide a data indication of performing any real-time events 311 back to the event streaming platform 310*a*.

In one or more embodiments, the batch decision application 306 utilizes additional data from the batch lane 304 to determine system actions. To illustrate, as shown in FIG. 3, a cloud database 330 can provide cloud data 332 to the batch decision application. In various embodiments, the cloud database 330 can include a variety of batch lane data. For example, the cloud database 330 can include user data, historical user actions, legal information, climate data, schedule or calendar data, and a variety of other data from the batch lane 304.

Further, in one or more embodiments, the batch decision application 306 receives identifier information via an identifier application 342. More specifically, in some embodiments a metadata database 334 provides criteria 336 to a workflow scheduler 314*b*. The workflow scheduler 314*b* can determine identifiers 340 based on the criteria 336. Further, the workflow scheduler 314*b* can provide criteria 336 to an identifier application 342. Thus, the identifier application can provide identifier information to the batch decision application 306. In one or more embodiments, identifier information includes user profile data, demographic information, user contact information, and other data related to user identifiers.

As also shown in FIG. 3, the real-time decision application 309 can provide orchestration data 312*a* to a data orchestration platform 314*b*. Similarly, the batch decision application 306 can provide orchestration data 312*b* to a data orchestration platform 314*b*. More specifically, the real-time decision application 309 and the batch decision application 306 can provide orchestration triggers and data related to orchestration triggers to the data orchestration platforms 314*a*-314*b*. For example, the real-time decision application 309 can provide an orchestration trigger to the data orchestration platform 314*a* that designates a survey for user profiles in response to determining that the profile has an "end of day" journey state and in response to a data indication of a real-time of a corresponding user device leaving a geofenced area. Based on the orchestration trigger including these criteria, the real-time decision application 309 can provide journey states and geofence information to the data orchestration platform 314*a*.

Additionally, as shown in FIG. 3, the data orchestration platforms 314*a*-314*b* can provide data to an experience orchestration platform 350. In one or more embodiments, the data orchestration platforms 314*a*-314*b* determine when an orchestration trigger is satisfied based on the orchestration data 312*a*-312*b* received from the real-time decision application 309 and the batch decision application 306. In response to determining that the orchestration trigger is satisfied, the data orchestration platforms 314*a*-314*b* provide a data indication to the experience orchestration platform to implement the orchestration trigger by implementing a system action indicated by the orchestration trigger.

For example, the real-time decision application 309 can provide orchestration data 312*a* to the data orchestration platform 314*a* that a user profile is currently at an "end of day" journey state and that a user device has, in real-time, left a geofenced area. In one or more embodiments, the data orchestration platform 314*a* compares this orchestration data 312*a* to an orchestration trigger that designates a survey for user profiles in response to determining that the profile has an "end of day" journey state and in response to a data indication of a real-time of a corresponding user device leaving a geofenced area. Thus, the data orchestration platform 314*a* can provide a data indication to the experience orchestration platform 350 that an orchestration trigger is satisfied and/or instructions for providing the digital survey to the appropriate user device.

Figure 4A:
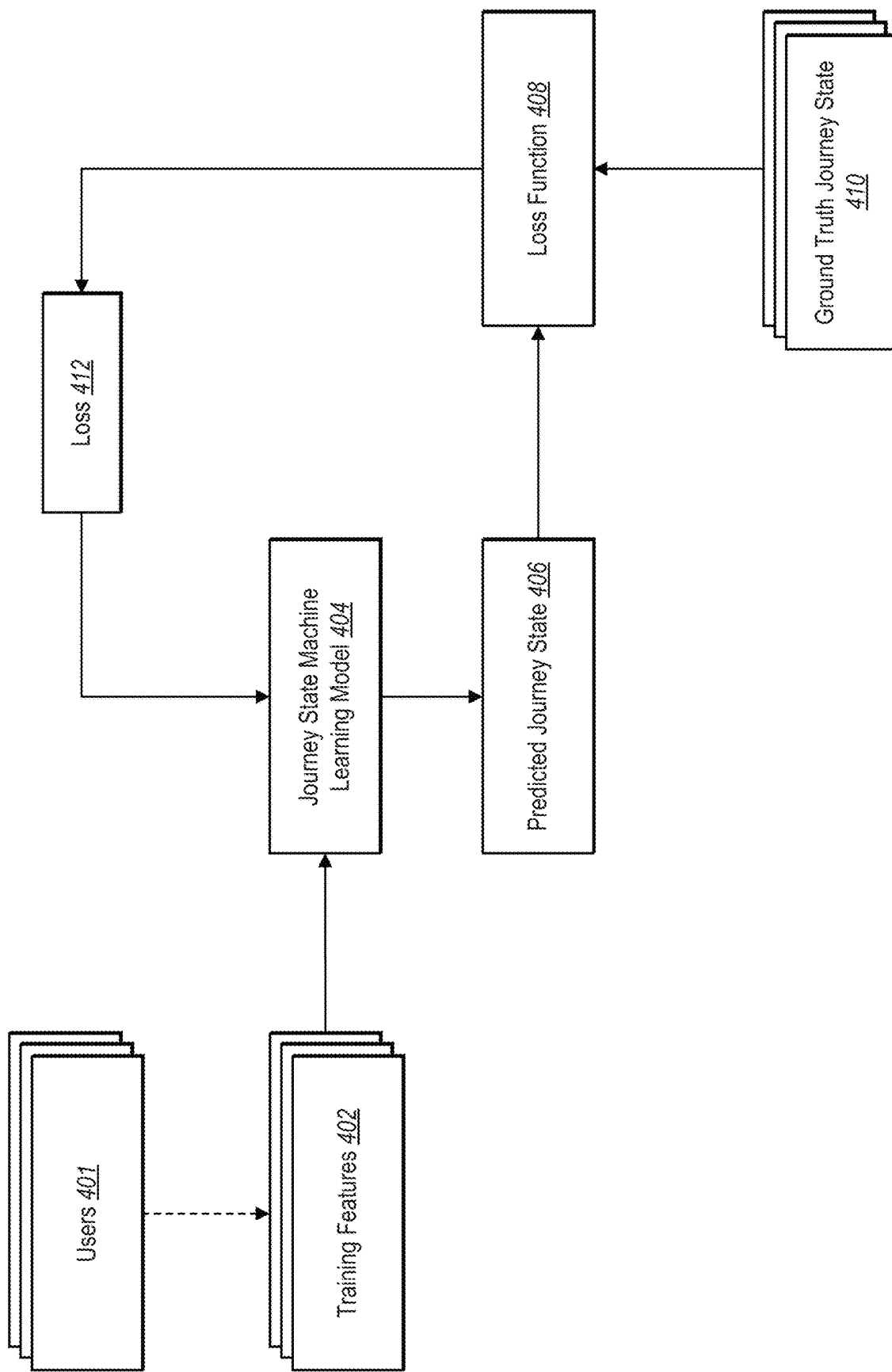
FIGS. 4A-4B illustrate the data journey system training and utilizing a journey state machine learning model in accordance with one or more embodiments.

As mentioned above, the data journey system 106 can intelligently determine journey states of a user with respect to experience journeys utilizing a machine-learning model. FIG. 4A illustrates the data journey system 106 training a journey state machine-learning model 404 to determine journey states based on user profile attributes and historical actions. In particular, FIG. 4A shows the journey state machine-learning model 404 determining a predicted journey state 406 for users based on training features 402. Subsequently, the journey state machine-learning model 404 compares the predicted journey state 406 to a ground truth journey state 410 to determine a loss 412 and update parameters of the journey state machine-learning model 404 to improve subsequent predictions.

As further shown in FIG. 4A, the data journey system 106 inputs training features 402 for users 401 into the journey state machine-learning model 404. In some embodiments, the data journey system 106 determines the training features 402 from a set of user profile attributes and historical user actions corresponding to user profiles of the users 401. In one or more embodiments, the training features 402 comprise a variety of different attributes, characteristics, or actions. For example, the training features 402 may include demographic information, historical user activity, potential future action scores, user survey responses, geographical information, user profile connections, and a variety of other data from an internal source or from a variety of third-party systems. As further examples, the training features 402 may include data indicating one or more of a product or service purchased by a user; a website or advertisement selected by the user; or a digital check-in at a location for an amusement park, airplane trip, or other experience.

Based on the training features 402, the journey state machine-learning model 404 generates the predicted journey state 406. A variety of machine-learning model structures can perform this act. For example, the journey state machine-learning model 404 can include one or more of a decision tree (e.g., a gradient boosted decision tree), a linear regression model, a logistic regression model, association rule learning, inductive logic programming, support vector learning, a Bayesian network, a regression-based model, principal component analysis, a clustering model, a neural network, or a combination thereof.

After the journey state machine-learning model 404 determines the predicted journey state 406 for a user, the data journey system 106 compares the predicted journey state 406 and the ground truth journey state 410 utilizing a loss function 408. In particular embodiments, the ground truth journey state 410 corresponds to a pre-defined journey state and/or a historical user segment determined based on historical user groupings or clusters of characteristics or actions. Based on this comparison using the loss function 408, the data journey system 106 generates the loss 412.

Examples of the loss function 408 can include a regression loss function (e.g., a mean square error function, a quadratic loss function, an L2 loss function, a mean absolute error/L1 loss function, mean bias error, etc.). Additionally, or alternatively, the loss function 408 can include a classification loss function (e.g., a hinge loss/multi-class SVM loss function, cross entropy loss/negative log likelihood function, etc.). In certain instances, the loss function 408 includes the Gini Index. Further, the loss function 408 can return the loss 412 comprising quantifiable data regarding the difference between the predicted journey state 406 and the ground truth journey state 410. In particular, the data journey system 106 can adjust various parameters/weights of the journey state machine-learning model 404 to improve the quality/accuracy of predicted journey states in subsequent iterations based on the loss 412 from the loss function 408.

As suggested by FIG. 4A, the training/learning of the journey state machine-learning model 404 can be an iterative process. Indeed, the data journey system 106 can continually adjust parameters and/or hyperparameters of the journey state machine-learning model 404 over learning cycles, as shown by the return arrow between the loss function 408 and the journey state machine-learning model 404. By incrementally adjusting parameters of the journey state machine-learning model 404 until satisfying a convergence threshold, the data journey system 106 improves the predicted journey states over training iterations.

Figure 4B:
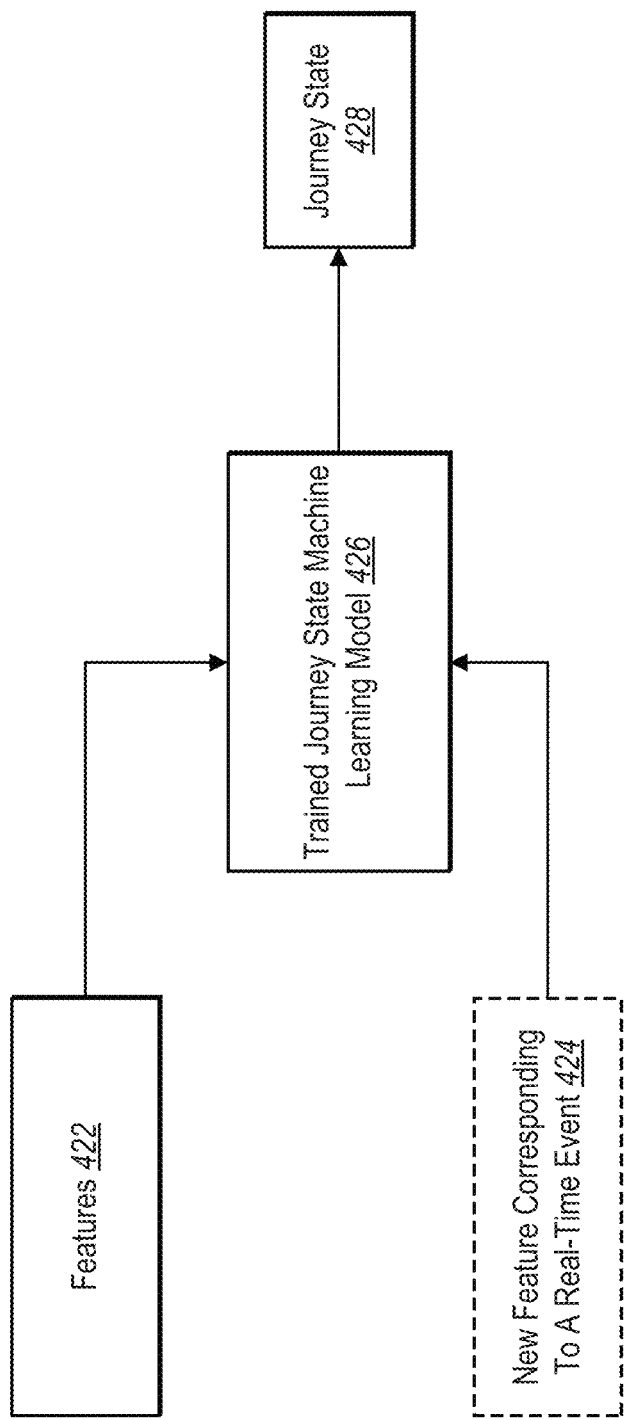

As mentioned above, in addition or in the alternative to training a journey state machine-learning model, the data journey system 106 can utilize a trained journey state machine-learning model to determine journey states corresponding to user profiles. In accordance with one or more embodiments, FIG. 4B illustrates the data journey system 106 using a trained journey state machine-learning model 426 to generate a journey state for a user based on various features. As indicated above, based on a determined journey state and a real-time event, the data journey system 106 can determine and perform various system actions.

As shown in FIG. 4B, the data journey system 106 inputs features 422 into the trained journey state machine-learning model 426. Similar to the discussion above, the features 422 can include a variety of data in a user profile from internal sources or from a variety of third-party systems, such as different attributes, characteristics, or actions of a user. For example, the features 422 may include one or more of demographic information, historical user activity, potential future action scores, user survey responses, geographical information, or user profile connections. As further examples, the features 422 may include data indicating one or more of a product or service purchased by a user; a website or advertisement selected by the user; or a digital check-in at a location for an amusement park, airplane trip, or other experience.

As further shown in FIG. 4B, the trained journey state machine-learning model 426 determines a journey state 428 for a user profile based on the features 422. As indicated above, the journey state 428 may be a particular action, interaction, point, stage, level, or attribute along (or corresponding to) an experience journey. For instance, the journey state 428 may be a location or ride within an amusement park; a membership level within a financial institution, subscription service, or store; an account designation or level; an interaction either online or in person with a particular product or service; a stage along a timeline for a rental experience (e.g., car or hotel).

As further indicated by FIG. 4B, the data journey system 106 can determine an updated journey state of a user corresponding to a user profile by inputting a new features corresponding to a real-time event into the trained journey state machine-learning model 426. To illustrate, based on receiving a data indication of a real-time event associated with a user profile, the data journey system 106 can identify and provide the new feature corresponding to the real-time event 424 to the trained journey state machine-learning model 426. Accordingly, the data journey system 106 can update the journey state 428 in real-time based on receiving updated data from internal sources or from a variety of third-party systems.

To illustrate, in one or more embodiments, the data journey system 106 identifies or receives a new user action or new user attribute and, in response to the user action, determines an updated journey state of the user based on features representing the new user action or new attribute. In addition, or in the alternative, the data journey system 106 can determine an updated journey state of the user based on receiving a new or updated attribute of a real-time event. In some embodiments, the data journey system 106 utilizes features representing the new user action, new user attribute, and/or the new or updated attribute of the real-time event as inputs for the journey state machine-learning model 426.

Figure 5A:
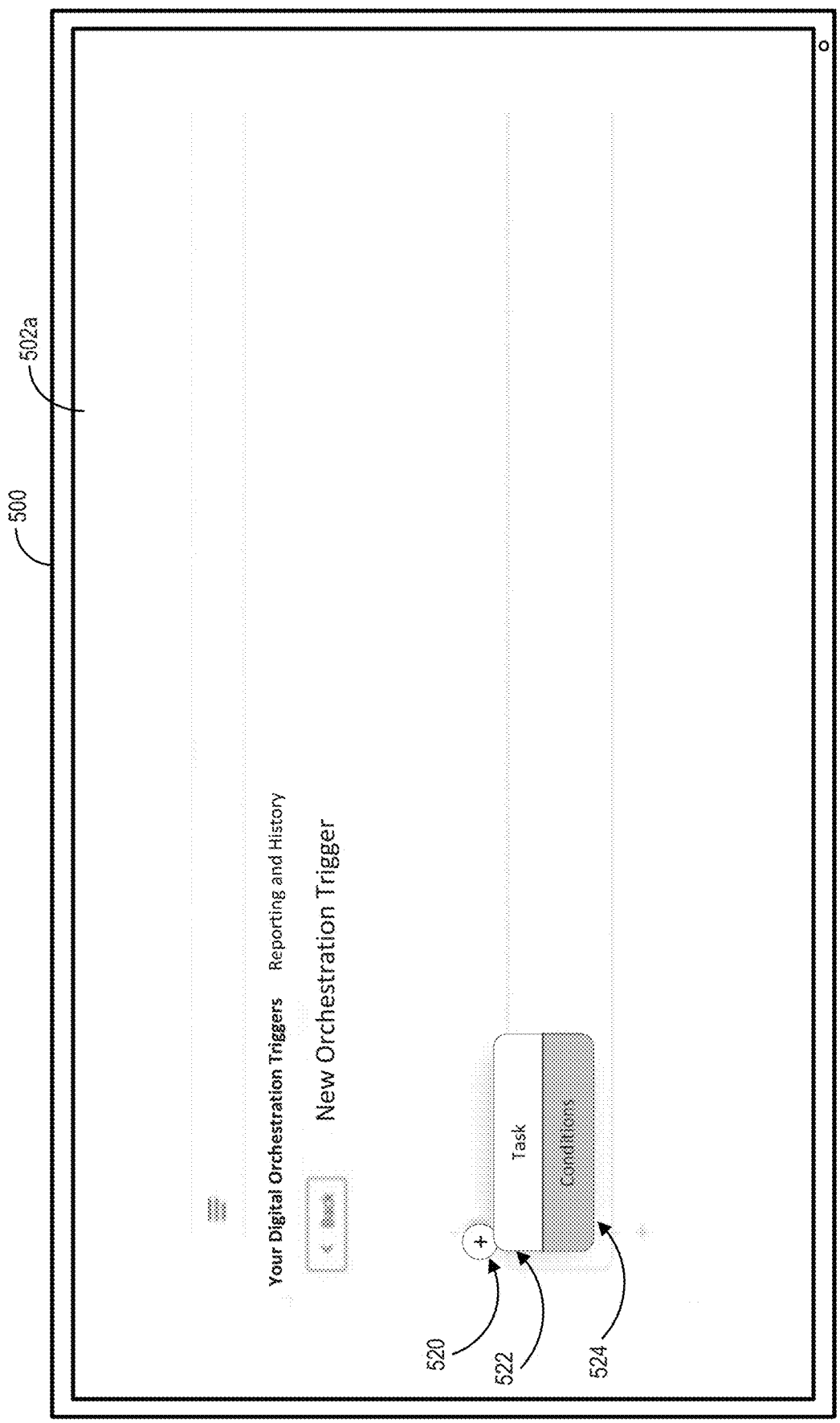
FIGS. 5A-5C illustrate example graphical user interfaces for generating orchestration triggers in accordance with one or more embodiments.
Figure 5B:
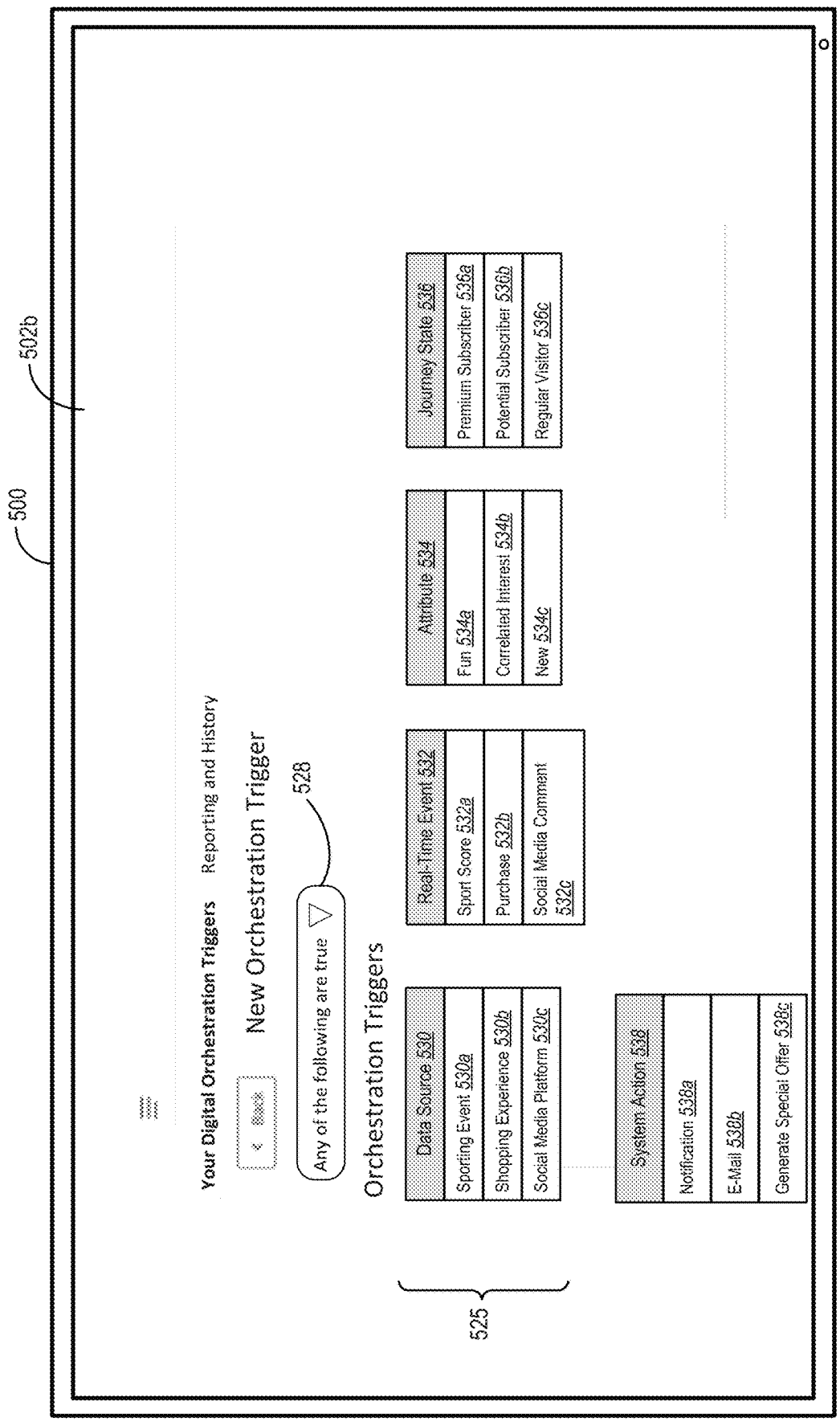
Figure 5C:
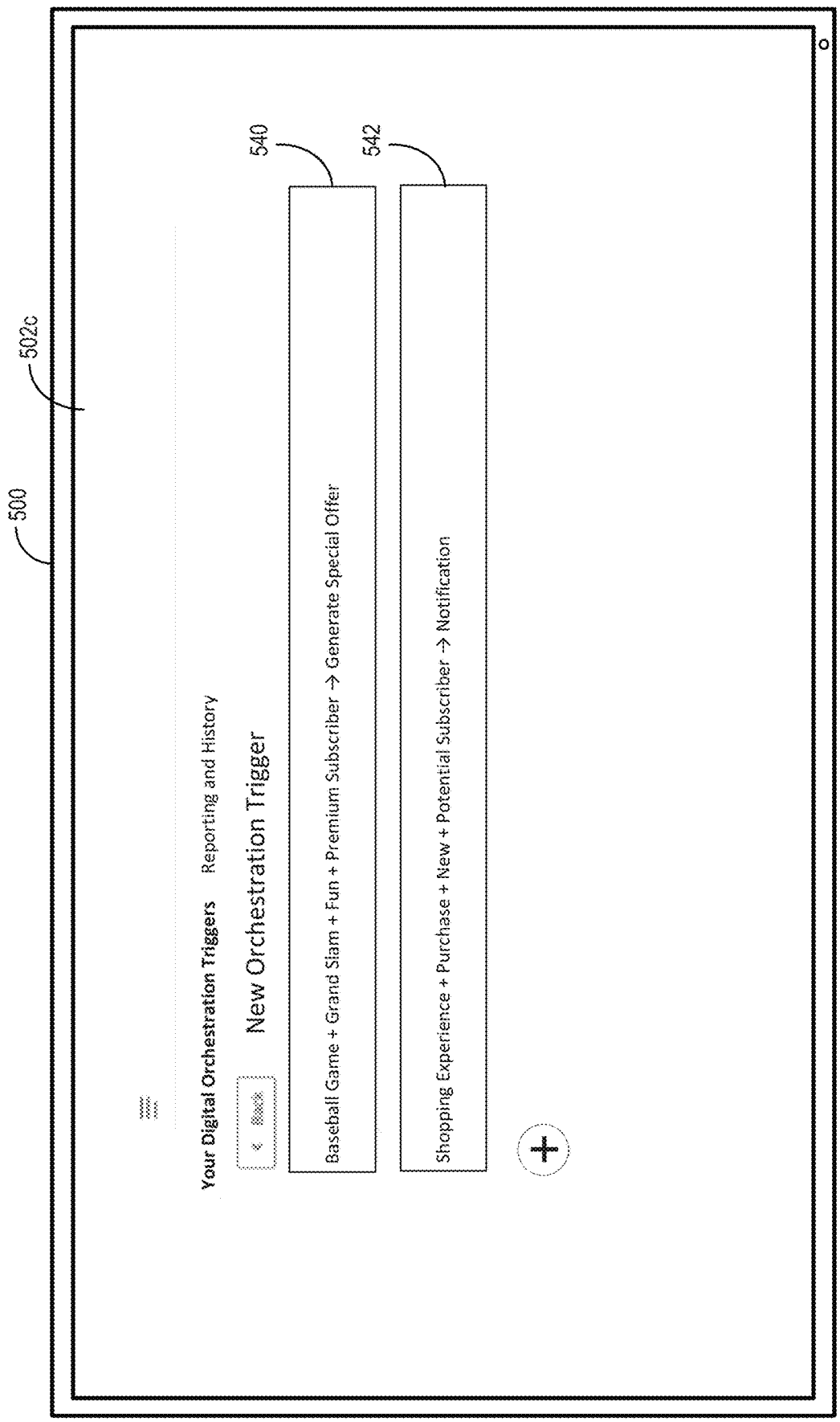

As discussed above, the data journey system 106 can generate a system action based on orchestration triggers according to user selections provided via a graphical user interface as part of a trigger-action sequence. FIGS. 5A-5C illustrate the data journey system 106 providing a trigger-action-sequence graphical user interfaces 502a-c via a computing device 500. More specifically, FIGS. 5A-5C illustrate navigation through the trigger-action-sequence graphical user interfaces 502a-c to generate an orchestration trigger.

As shown in FIG. 5A, for example, the trigger-action-sequence graphical user interface 502a includes an add-on selection button 520. In response to detecting user interaction with the add-on selection button 520, the computing device 500 presents a task-selection option 522 and a condition-selection option 524. Based on interactions with the task-selection option 522, the data journey system 106 initiates a series of user interface presentations on the computing device 500 that correspond to selecting one or more system actions triggered by an orchestration trigger. As discussed above, the data journey system 106 can generate orchestration triggers including a variety of system actions, including on third-party systems.

Similarly, based on interactions with the condition-selection option 524, the data journey system 106 initiates a series of user interface presentations on the computing device 500 that correspond to selecting one or more conditions for performing a system action. More specifically, in one or more embodiments, the data journey system 106 can provide conditions for orchestration triggers designating particular data sources, real-time events, user attributes, and/or journey states. Accordingly, in one or more embodiments, the data journey system 106 generates selectable options for various orchestration triggers utilizing these designated data sources, real-time events, user attributes, and/or journey states.

Indeed, in response to or based on identifying a user selection of the condition-selection option 524 and/or the task-selection option 522, the computing device 500 presents the trigger-action-sequence graphical user interface 502b as shown in FIG. 5B. In FIG. 5B, the trigger-action-sequence graphical user interface 502b includes a condition operation drop-down menu 528. In one or more embodiments, in response to receiving user interaction with the condition operation drop-down menu 528, the data journey system 106 provides options for inclusion rules corresponding to conditions for the orchestration trigger. For example, the condition operation drop-down menu 528 can include options for implementing the orchestration trigger if any of the selected conditions are true, all of the selected conditions are true, and/or a threshold number of the selected conditions are true. In response to user interaction with the condition operation drop-down menu 528, the data journey system 106 can set an inclusion condition for the orchestration trigger.

As mentioned above, an orchestration trigger can include trigger conditions that include various parameters. More particularly, in some cases, the conditions include parameters or rules. If the data journey system 106 detects that these parameters or rules are satisfied, the data journey system 106 can perform a system action upon identifying the corresponding orchestration trigger as part of a trigger-action sequence. As shown in FIG. 5B, the trigger-action-sequence graphical user interface 502b includes orchestration trigger condition menus 525. The orchestration trigger condition menus 525 include a data source menu 530 with data source options 530a, 530b, and 530c, a real-time event menu with real-time event options 532a, 532b, and 532c, an attribute menu 534 with attribute options 524a, 524b, and 524c, and a journey state menu 536 with journey state options 536a, 536b, and 536c.

As mentioned above, the data journey system 106 can receive real-time and batch data from a variety of sources, including from internal computing systems and various third-party systems. In one or more embodiments, the data journey system 106 can include designated data sources in orchestration triggers. As shown in FIG. 5B, the data source menu 530 includes the data source options 530a-530c including a sporting event (e.g., a baseball game), a shopping experience, and a social media platform. Based on user selection of one or more of the data source options 530a-530c, the data journey system 106 can designate a particular data source for the orchestration trigger. However, it will be appreciated that the data journey system 106 can utilize a variety of data sources for orchestration triggers based on a user selection.

Additionally, the data journey system 106 can receive data indications of a variety of real-time events. In some embodiments, the data journey system 106 includes designated real-time event categorizations in orchestration triggers. To illustrate, as shown in FIG. 5B, the real-time event menu 532 includes the real-time event options 532a-532c including a sports score (e.g., grand slam, a base hit, or a run), a purchase, and a social media comment. Based on user selection of one or more of the real-time events 532a-532c, the data journey system 106 can designate a real-time event for an orchestration trigger. However, as discussed above, the data journey system 106 can respond to a variety of real-time events, including events received via a variety of third-party systems.

As further discussed above, in one or more embodiments, the data journey system 106 identifies user attributes associated with real-time events. Additionally, in some embodiments, the data journey system 106 designates user attributes and/or real-time event attributes for orchestration triggers. To illustrate, as shown in FIG. 5B, the attribute menu 534 includes the attribute options 534a-534c including a grand slam, a base hit, and a run. Based on user selection of one or more of the real-time events 534a-534c, the data journey system 106 can designate an attribute for an orchestration trigger. However, as discussed above, the data journey system 106 can utilize a variety of attributes, such as demographic information, user groups, user connections, historical user actions, etc.

The data journey system 106 can also utilize journey states to determine system actions based on user selections of system actions corresponding to selected orchestration triggers. Accordingly, in one or more embodiments, the data journey system 106 designates one or more journey states corresponding to orchestration triggers. As shown in FIG. 5B, the journey state menu 536 includes the journey state options 536a-536c including a premium subscriber, a potential subscriber, and a regular visitor. In one or more embodiments, the data journey system 106 designates one or more journey states for an orchestration trigger based on user selection received via the journey state menu 536. As discussed above, the data journey system 106 can utilize a variety of types of journey states from various experience journeys.

As further shown in FIG. 5B, the trigger-action-sequence graphical user interface 502b also includes a system action menu 538 including system action options 538a, 538b, and 538c of notification, e-mail, and generate special offer. As discussed above, the data journey system 106 can implement various system actions selected by a user via the trigger-action-sequence graphical user interface 502b in response to determining that an orchestration trigger is satisfied. Thus, in one or more embodiments, the data journey system 106 designates a system action corresponding to an orchestration trigger based on user interaction received via the system action menu 538.

In one or more embodiments, the data journey system 106 generates trigger-action sequences based on user selections received via the trigger-action-sequence graphical user interface 502b. As shown in FIG. 5C, the computing device 500 can also present trigger-action sequences within the trigger-action-sequence graphical user interface 502c. Upon generating trigger-action sequences comprising orchestration triggers and corresponding system actions, in some embodiments, the data journey system 106 generates listings of trigger-action sequences for efficient viewing and/or editing.

As shown in FIG. 5C, the trigger-action-sequence graphical user interface 502c includes trigger-action-sequence listings 540 and 542 for corresponding trigger-action sequences. The trigger-action-sequence listing 540 includes the text "Baseball Game+Grand Slam+Fun+Premium Subscriber→Generate Special Offer." As the trigger-action-sequence listing 540 indicates, the data journey system 106 generates a trigger-action sequence comprising orchestration triggers of a baseball game or corresponding system as a data source, a grand slam as a real-time event, fun as an attribute, and premium subscriber as a journey state. Upon detecting the combination of such orchestration triggers, the data journey system 106 determines and performs a system action of generating and sending a special offer (e.g., discount tickets) as part of a trigger-action sequence.

As further shown in FIG. 5C, the trigger-action-sequence listing 542 includes the text "Shopping Experience+Purchase+New+Potential Subscriber→Notification." As the trigger-action-sequence listing 542 indicates, the data journey system 106 generates a trigger-action sequence comprising orchestration triggers of a shopping experience or corresponding system of a store as a data source, a purchase of the user as a real-time event, new as an attribute (e.g., new purchase of a first-time customer of a store or of a product), and potential subscriber as a journey state. Upon detecting the combination of such orchestration triggers, the data journey system 106 determines and performs a system action of generating and sending a notification (e.g., push notification of a subscription service for the product) as part of a trigger-action sequence.

Thus, as discussed, the data journey system 106 generates orchestration triggers based on user selections. More specifically, the data journey system 106 receives one or more user selections of data sources, real-time events, attributes of given users, and/or journey states. The data journey system 106 generates trigger-action sequences based on these user selections and provides corresponding listings, as shown in FIG. 5C. Thus, as discussed above, the data journey system 106 implements system action utilizing trigger-action sequences.

Figure 6:
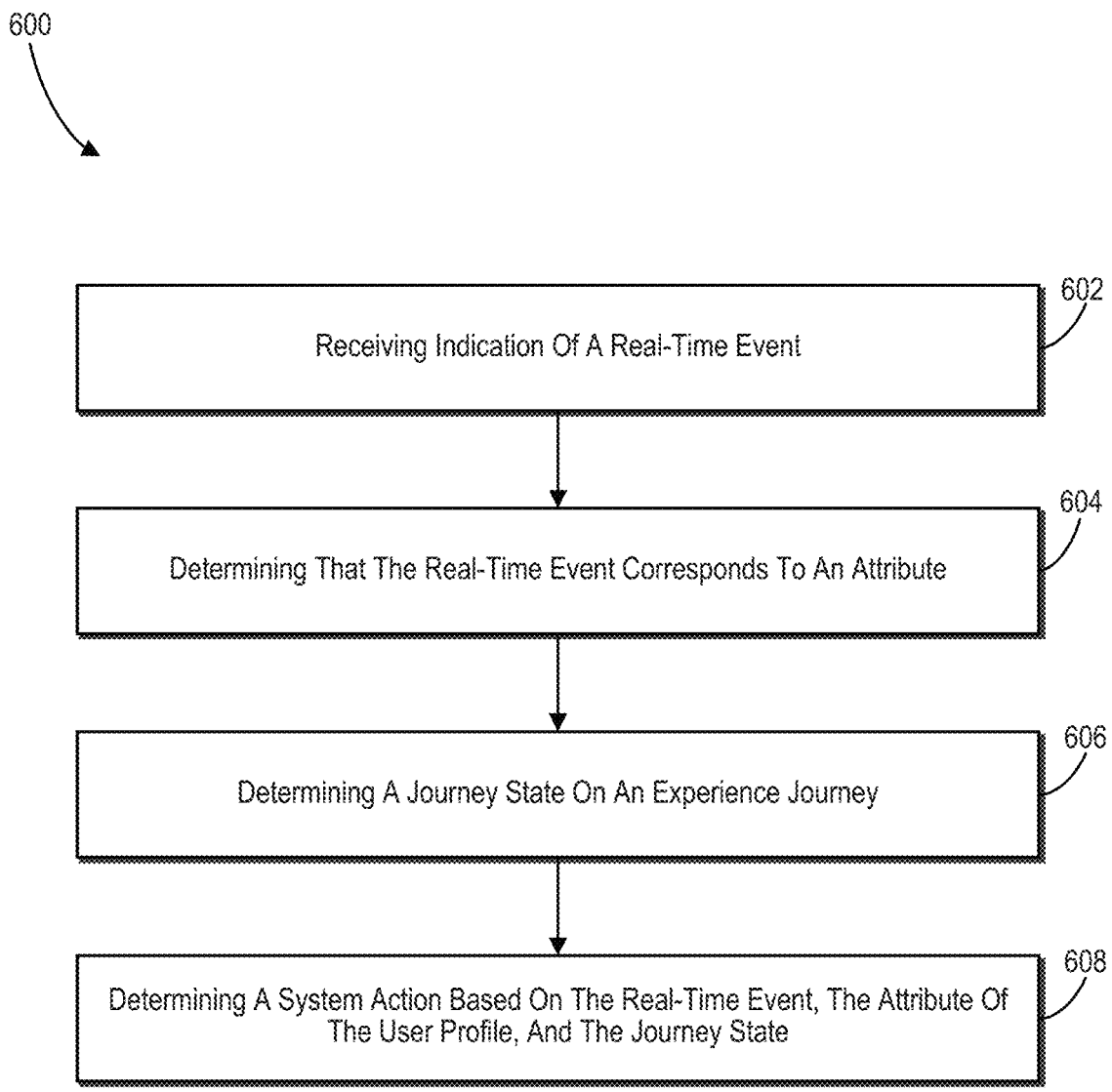
FIG. 6 illustrates a flowchart of a series of acts for determining and implementing system actions in accordance with one or more embodiments.

FIGS. 1-5C, the corresponding text, and the examples provide a number of different methods, systems, devices, and non-transitory computer-readable media of the data journey system 106. In addition to the foregoing, one or more embodiments can also be described in terms of flowcharts comprising acts for accomplishing a particular result, as shown in FIG. 6. FIG. 6 may be performed with more or fewer acts. Further, the acts may be performed in differing orders. Additionally, the acts described herein may be repeated or performed in parallel with one another or parallel with different instances of the same or similar acts.

As mentioned, FIG. 6 illustrates a flowchart of a series of acts 600 for determining system action utilizing a real-time event, a corresponding attribute of a user profile, and a journey state in accordance with one or more embodiments. While FIG. 6 illustrates acts according to one embodiment, alternative embodiments may omit, add to, reorder, and/or modify any of the acts shown in FIG. 6. The acts of FIG. 6 can be performed as part of a method. Alternatively, a non-transitory computer-readable medium can comprise instructions that, when executed by one or more processors, cause a computing device to perform the acts of FIG. 6. In some embodiments, a system can perform the acts of FIG. 6.

As shown in FIG. 6, the series of acts 600 includes an act 602 for receiving indication of a real-time event. In particular, the act 602 can include receiving a data indication of a real-time event. Specifically, the act 602 can include receiving a data indication of a real-time event from a third-party system.

Additionally, the series of acts 600 includes an act 604 for determining that the real-time event corresponds to an attribute. In particular, the act 604 can include determining that the real-time event corresponds to an attribute of a user profile. Specifically, the act 604 can include identifying the attribute of the user profile as part of a plurality of features corresponding to the experience journey of the user.

As also shown in FIG. 6, the series of acts 600 includes an act 606 for determining a journey state on an experience journey. In particular, the act 606 can include determining a journey state of the user with respect to an experience journey. Specifically, the act 606 can include determining, utilizing a journey state machine-learning model, the journey state of the user with respect to the experience journey based on the plurality of features corresponding to the experience journey. Further, in one or more embodiments, the act 606 includes assigning the user into a journey-state cluster of users corresponding to the journey state. Additionally, the act 606 can include determining, utilizing the journey state machine-learning model, an updated journey state of the user differing from a previous journey state of the user with respect to the experience journey based on the plurality of features. Further, in one or more embodiments, the act 606 includes determining the journey state of the user by determining an updated journey state of the user differing from a previous journey state of the user with respect to the experience journey Further, as shown in FIG. 6, the series of acts 600 includes an act 608 for determining a system action based on the real-time event, the attribute of the user profile, and the journey state. In particular, the act 608 can include determining a system action corresponding to the user profile based on the real-time event, the attribute of the user profile, and the journey state. Specifically, the act 608 can include generating a future action score reflecting a likelihood of a potential user action based on one or more of the real-time event, the attribute of the user profile, or the journey state, and determining the system action corresponding to the user profile based further on the future action score. Additionally, in some embodiments, the act 608 includes wherein the future action score comprises a score reflecting the likelihood that the user will discontinue use of a product or service. In one or more embodiments, the act 608 also includes scheduling a time for the system action based on the real-time event, the attribute of the user profile, and the journey state.

In one or more embodiments, the act 608 also includes determining a predicted system action based on the future action score, receiving a second data indication of a second real-time event, comparing the second real-time event to the predicted system action, and updating one or more scoring criteria corresponding to the future action score based on the comparison of the second real-time event to the predicted system action. Additionally, the act 608 can include providing, for display on a client device, a graphical user interface comprising one or more selectable options for orchestration triggers and one or more selectable options for system actions, receiving user selections of an orchestration trigger from the orchestration triggers and the system action from the system actions, and generating a trigger-action sequence that performs the system action upon detecting the orchestration trigger. Further, the act 608 can also include wherein receiving a user selection of the orchestration trigger comprises receiving one or more of a selected data source, a selected real-time event, a selected attribute of a given user, and a selected journey state.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 7:
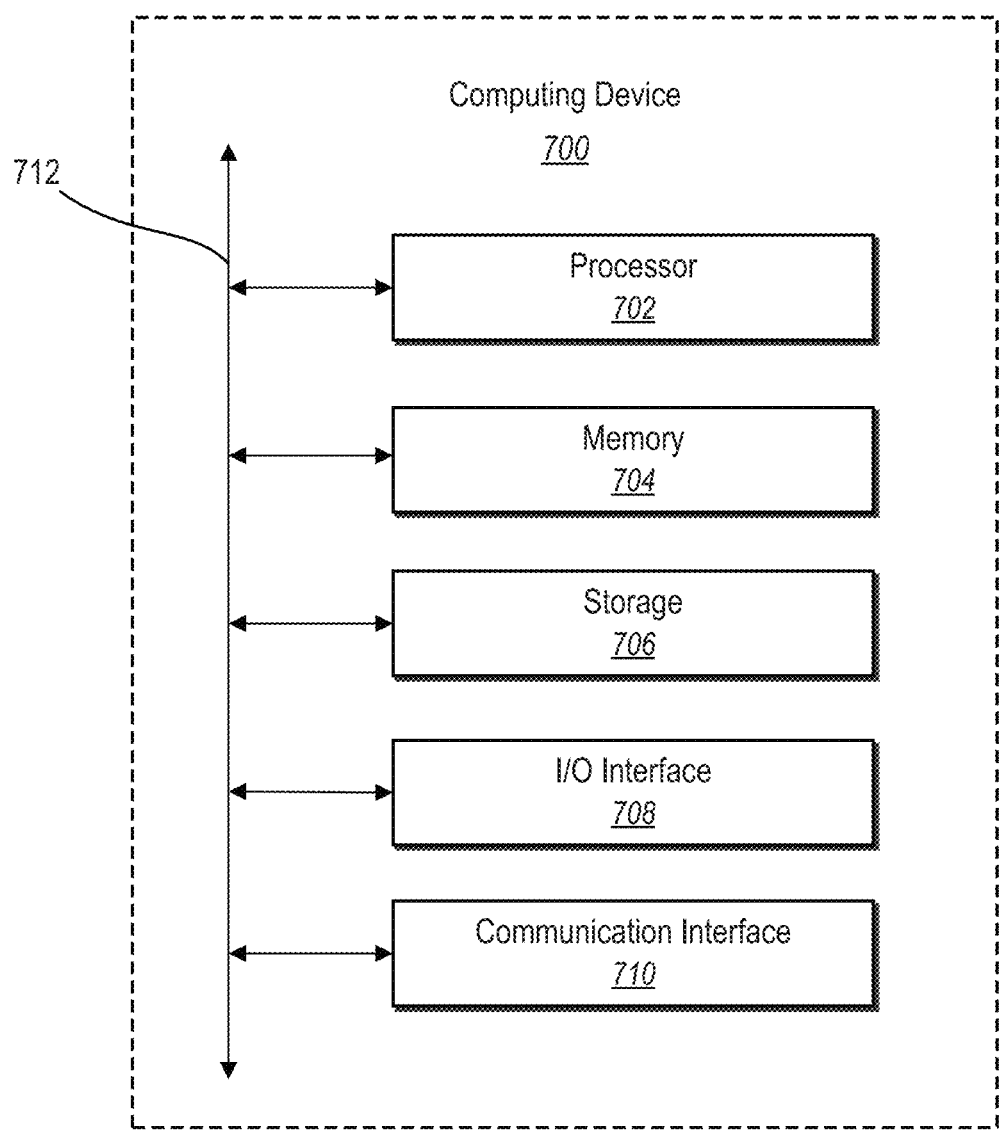
FIG. 7 illustrates a block diagram of an example computing device for implementing one or more embodiments of the present disclosure.

FIG. 7 illustrates a block diagram of an example computing device 700 that may be configured to perform one or more of the processes described above. One will appreciate that one or more computing devices, such as the computing device 700 may represent the computing devices described above (e.g., client devices 102a-102n, the server device 108, the third-party server(s) 112, and/or the computing device 500). In one or more embodiments, the computing device 700 may be a mobile device (e.g., a mobile telephone, a smartphone, a PDA, a tablet, a laptop, a camera, a tracker, a watch, a wearable device, etc.). In some embodiments, the computing device 700 may be a non-mobile device (e.g., a desktop computer or another type of client device). Further, the computing device 700 may be a server device that includes cloud-based processing and storage capabilities.

As shown in FIG. 7, the computing device 700 can include one or more processor(s) 702, memory 704, a storage device 706, input/output interfaces 708 (or "I/O interfaces 708"), and a communication interface 710, which may be communicatively coupled by way of a communication infrastructure (e.g., bus 712). While the computing device 700 is shown in FIG. 7, the components illustrated in FIG. 7 are not intended to be limiting. Additional or alternative components may be used in other embodiments. Furthermore, in certain embodiments, the computing device 700 includes fewer components than those shown in FIG. 7. Components of the computing device 700 shown in FIG. 7 will now be described in additional detail.

In particular embodiments, the processor(s) 702 includes hardware for executing instructions, such as those making up a computer program. As an example, and not by way of limitation, to execute instructions, the processor(s) 702 may retrieve (or fetch) the instructions from an internal register, an internal cache, memory 704, or a storage device 706 and decode and execute them.

The computing device 700 includes memory 704, which is coupled to the processor(s) 702. The memory 704 may be used for storing data, metadata, and programs for execution by the processor(s). The memory 704 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 704 may be internal or distributed memory.

The computing device 700 includes a storage device 706 includes storage for storing data or instructions. As an example, and not by way of limitation, the storage device 706 can include a non-transitory storage medium described above. The storage device 706 may include a hard disk drive (HDD), flash memory, a Universal Serial Bus (USB) drive or a combination these or other storage devices.

As shown, the computing device 700 includes one or more I/O interfaces 708, which are provided to allow a user to provide input to (such as user strokes), receive output from, and otherwise transfer data to and from the computing device 700. These I/O interfaces 708 may include a mouse, keypad or a keyboard, a touch screen, camera, optical scanner, network interface, modem, other known I/O devices or a combination of such I/O interfaces 708. The touch screen may be activated with a stylus or a finger.

The I/O interfaces 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 708 are configured to provide graphical data to a display for presentation to a user. The graphical data may be representative of one or more graphical user interfaces and/or any other graphical content as may serve a particular implementation.

The computing device 700 can further include a communication interface 710. The communication interface 710 can include hardware, software, or both. The communication interface 710 provides one or more interfaces for communication (such as, for example, packet-based communication) between the computing device and one or more other computing devices or one or more networks. As an example, and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI. The computing device 700 can further include a bus 712. The bus 712 can include hardware, software, or both that connects components of the computing device 700 to each other.

Figure 8:
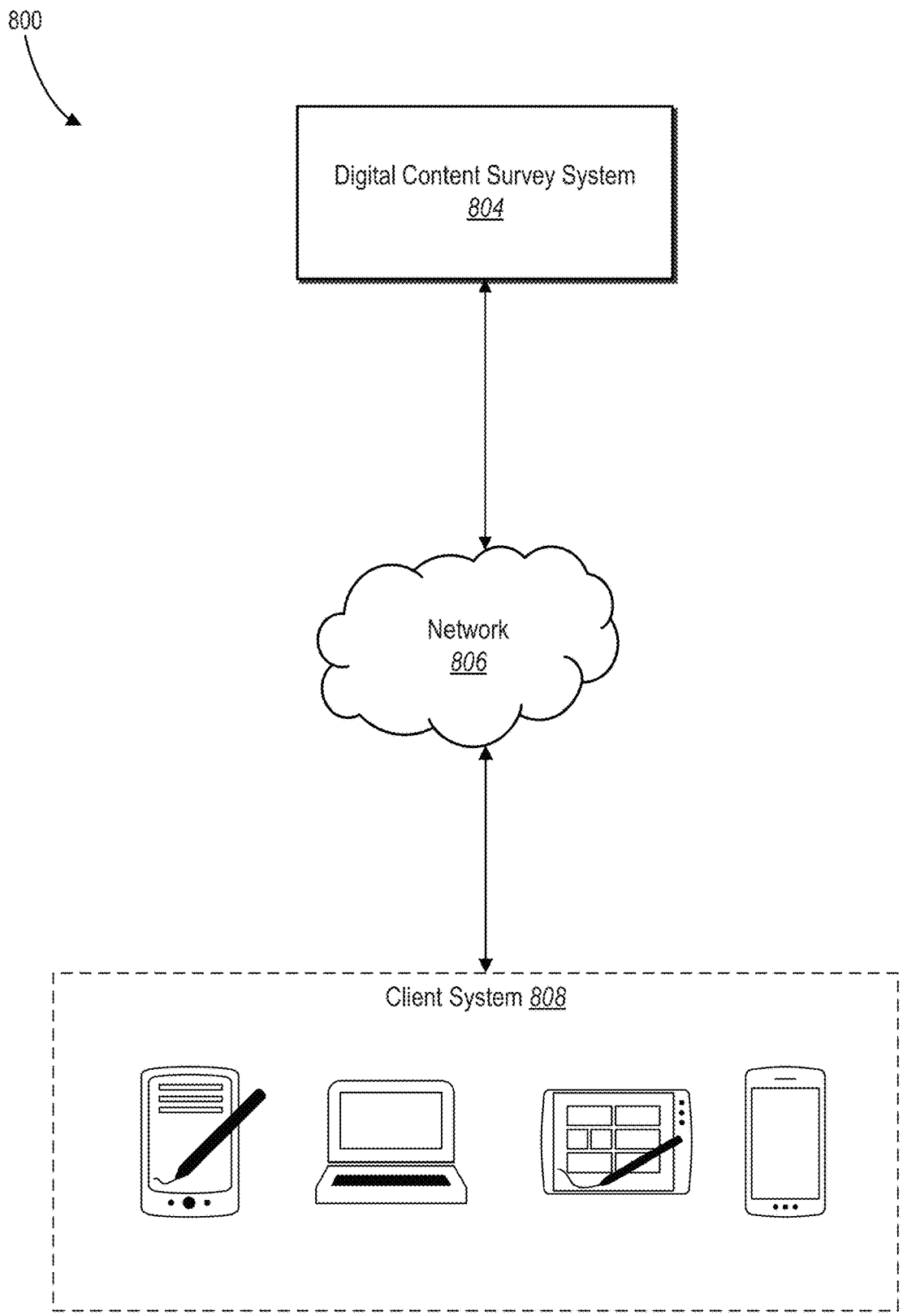
FIG. 8 illustrates a network environment of a data journey system in accordance with one or more embodiments.

FIG. 8 illustrates an example network environment 800 of the data journey system 106. Network environment 800 includes a server device 802 and client device 806 connected to each other by a network 804. Although FIG. 8 illustrates a particular arrangement of client device 806, server device 802, and network 804, this disclosure contemplates any suitable arrangement of client device 806, server device 802, and network 804. As an example, and not by way of limitation, two or more of the client devices 806 and server device 802 may be connected to each other directly, bypassing network 804. As another example, two or more of client devices 806 and server device 802 may be physically or logically co-located with each other in whole, or in part. Moreover, although FIG. 8 illustrates a particular number of client devices 806, server device 802, and networks 804, this disclosure contemplates any suitable number of client devices 806, server device 802, and networks 804. As an example, and not by way of limitation, network environment 800 may include multiple client devices 806, multiple server devices 802, and networks 804.

This disclosure contemplates any suitable network 804. As an example and not by way of limitation, one or more portions of network 804 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 804 may include one or more networks 804.

Links may connect client device 806 and server device 802 to network 804 or to each other. This disclosure contemplates any suitable links. In particular embodiments, one or more links include one or more wireline (such as for example Digital Subscriber Line ("DSL") or Data Over Cable Service Interface Specification ("DOCSIS")), wireless (such as for example Wi-Fi or Worldwide Interoperability for Microwave Access ("WiMAX")), or optical (such as for example Synchronous Optical Network (SONET) or Synchronous Digital Hierarchy ("SDH")) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 800. One or more first links may differ in one or more respects from one or more second links.

In particular embodiments, client device 806 may be an electronic device including hardware, software, or embedded logic components or a combination of two or more such components and capable of carrying out the appropriate functionalities implemented or supported by client device 806. As an example, and not by way of limitation, a client device 806 may include any of the computing devices discussed above in relation to FIG. 6. A client device 806 may enable a network user at client device 806 to access network 804.

In particular embodiments, client device 806 may include a web browser, such as MICROSOFT EDGE, GOOGLE CHROME, or MOZILLA FIREFOX, and may have one or more add-ons, plug-ins, or other extensions, such as TOOLBAR or YAHOO TOOLBAR. A user at client device 806 may enter a Uniform Resource Locator ("URL") or other address directing the web browser to a particular server (such as server, or a server associated with a third-party system), and the web browser may generate a Hyper Text Transfer Protocol ("HTTP") request and communicate the HTTP request to server. The server may accept the HTTP request and communicate to client device 806 one or more Hyper Text Markup Language ("HTML") files responsive to the HTTP request. Client device 806 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, server device 802 may include a variety of servers, sub-systems, programs, modules, logs, and data stores. In particular embodiments, server device 802 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Server device 802 may also include suitable components such as network interfaces, security mechanisms, load balancers, failover servers, management-and-network-operations consoles, other suitable components, or any suitable combination thereof.

In particular embodiments, server device 802 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. Additionally, a user profile may include financial and billing information of users (e.g., respondents, customers).

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
   receiving a data indication of a real-time event;
   determining that the real-time event corresponds to an attribute of a user profile that is part of a plurality of features corresponding to an experience journey of a user, the experience journey comprising a set of journey states reflecting stages of interaction along a timeline;
   determining, with a journey state machine-learning model and based on a feature of the real-time event, a journey state indicating a current stage of interaction of the user with respect to the experience journey, wherein the journey state machine-learning model comprises a machine-learning model iteratively trained by:
   predicting journey states for training features; and
   modifying the journey state machine-learning model based on comparing the journey states with ground truth journey states utilizing a loss function;
   generating a future action score reflecting a likelihood that a user will discontinue use of a product or service based on the real-time event, the attribute of the user profile, and the journey state; and
   determining a system action corresponding to the user profile based on the future action score.

2. The method of claim 1, further comprising:
   determining, utilizing the journey state machine-learning model, the journey state of the user with respect to the experience journey based on the plurality of features corresponding to the experience journey.

3. The method of claim 2, further comprising assigning the user into a journey-state cluster of users corresponding to the journey state.

4. The method of claim 2, wherein determining the journey state of the user comprises determining, utilizing the journey state machine-learning model, an updated journey state of the user differing from a previous journey state of the user with respect to the experience journey based on the plurality of features.

5. The method of claim 1, further comprising:
   determining that the user profile has insufficient data for generating the future action score;
   in response to determining that the user profile has insufficient data for generating the future action score, identifying one or more similar user profiles to the user profile;
   generating supplemented data by supplementing similar data from the one or more similar user profiles to data from the user profile; and
   generating the future action score utilizing the supplemented data.

6. The method of claim 1, wherein the future action score comprises a score reflecting the likelihood that the user will discontinue use of a product or service.

7. The method of claim 1, further comprising:
   determining a predicted system action based on the future action score;
   receiving a second data indication of a second real-time event;
   comparing the second real-time event to the predicted system action; and
   updating one or more scoring criteria corresponding to the future action score based on comparing the second real-time event to the predicted system action.

8. The method of claim 1, further comprising:
   providing, for display on a client device, a graphical user interface comprising one or more selectable options for orchestration triggers and one or more selectable options for system actions;
   receiving user selections of an orchestration trigger from the orchestration triggers and the system action from the system actions; and
   generating a trigger-action sequence that performs the system action upon detecting the orchestration trigger.

9. The method of claim 8, wherein receiving a user selection of the orchestration trigger comprises receiving one or more of a selected data source, a selected real-time event, a selected attribute of a given user, and a selected journey state.

10. The method of claim 1, further comprising scheduling a time for the system action based on the real-time event, the attribute of the user profile, and the journey state.

11. A non-transitory computer-readable medium storing instructions that, when executed by at least one processor, cause a computing device to:
receive a data indication of a real-time event;
determine that the real-time event corresponds to an attribute of a user profile represented by a graph comprising unified data from a plurality of sources, where the attribute of the user profile is part of a plurality of features corresponding to an experience journey of a user, the experience journey comprising a set of journey states reflecting stages of interaction along a timeline;
determine, with a journey state machine-learning model and based on a feature of the real-time event, a journey state indicating a current stage of interaction of the user with respect to the experience journey, wherein the journey state machine-learning model comprises a machine-learning model iteratively trained by:
predicting journey states for training features; and
modifying the journey state machine-learning model based on comparing the journey states with ground truth journey states utilizing a loss function;
generate a future action score reflecting a likelihood that a user will discontinue use of a product or service based on the real-time event, the attribute of the user profile, and the journey state; and
determine a system action corresponding to the user profile based on the future action score.

12. The non-transitory computer-readable medium of claim 11, further comprising instructions that, when executed by the at least one processor, cause the computing device to determine the journey state of the user by determining an updated journey state of the user differing from a previous journey state of the user with respect to the experience journey.

13. The non-transitory computer-readable medium of claim 11, further comprising instructions that, when executed by the at least one processor, cause the computing device to:
determine, utilizing a journey state machine-learning model, the journey state of the user with respect to the experience journey based on the plurality of features corresponding to the experience journey; and
assign the user into a journey-state cluster of users corresponding to the journey state.

14. The non-transitory computer-readable medium of claim 13, further comprising instructions that, when executed by the at least one processor, cause the computing device to determine the journey state of the user by utilizing the journey state machine-learning model, an updated journey state of the user differing from a previous journey state of the user with respect to the experience journey based on the plurality of features.

15. The non-transitory computer-readable medium of claim 11, further comprising instructions that, when executed by the at least one processor, cause the computing device to:
determine a predicted user action based on the future action score;
receive a second data indication of a second real-time event;
compare the second real-time event to the predicted user action; and
update one or more scoring criteria corresponding to the future action score based on comparing the second real-time event to the predicted user action.

16. The non-transitory computer-readable medium of claim 11, further comprising instructions that, when executed by the at least one processor, cause the computing device to:
provide, for display on a client device, a graphical user interface comprising one or more selectable options for orchestration triggers and one or more selectable options for system actions;
receive user selections of an orchestration trigger from the orchestration triggers and the system action from the system actions by receiving user selection of one or more of a selected data source, a selected real-time event, a selected attribute of a given user, and a selected journey state; and
generating a trigger-action sequence that performs the system action upon detecting the orchestration trigger.

17. A system comprising:
at least one processor; and
at least one non-transitory computer-readable storage medium storing instructions that, when executed by the at least one processor, cause the system to:
receive a data indication of a real-time event;
determine that the real-time event corresponds to an attribute of a user profile represented by a graph comprising unified data from a plurality of sources, where the attribute of the user profile is part of a plurality of features corresponding to an experience journey of a user, the experience journey comprising a set of journey states reflecting stages of interaction along a timeline;
determine, with a journey state machine-learning model and based on a feature of the real-time event, a journey state indicating a current stage of interaction of the user with respect to the experience journey, wherein the journey state machine-learning model comprises a machine-learning model iteratively trained by:
predicting journey states for training features; and
modifying the journey state machine-learning model based on comparing the journey states with ground truth journey states utilizing a loss function;
generate a future action score reflecting a likelihood that a user will discontinue user of a product or service based on the real-time event, the attribute of the user profile, and the journey state; and
determine a system action corresponding to the user profile based on the future action score.

18. The system of claim 17, further comprising instructions that, when executed by the at least one processor, cause the system to determine the journey state of the user by determining an updated journey state of the user differing from a previous journey state of the user with respect to the experience journey.

19. The system of claim 17, further comprising instructions that, when executed by the at least one processor, cause the system to:
determine, utilizing a journey state machine-learning model, the journey state of the user with respect to the experience journey based on the plurality of features corresponding to the experience journey; and
assign the user into a journey-state cluster of users corresponding to the journey state.

20. The system of claim 19, further comprising instructions that, when executed by the at least one processor, cause the system to determine the journey state of the user by utilizing the journey state machine-learning model, an updated journey state of the user differing from a previous journey state of the user with respect to the experience journey based on the plurality of features.

\* \* \* \* \*